United States Patent
Liu et al.

(10) Patent No.: US 10,210,615 B2
(45) Date of Patent: Feb. 19, 2019

(54) SYSTEM AND METHOD FOR EXTRINSIC CAMERA PARAMETERS CALIBRATION BY USE OF A THREE DIMENSIONAL (3D) CALIBRATION OBJECT

(71) Applicant: SONY CORPORATION, Tokyo (JP)

(72) Inventors: Cheng-Yi Liu, San Jose, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 185 days.

(21) Appl. No.: 15/066,997

(22) Filed: Mar. 10, 2016

(65) Prior Publication Data
US 2017/0262971 A1    Sep. 14, 2017

(51) Int. Cl.
*G06T 7/00* (2017.01)
*G06T 7/40* (2017.01)

(52) U.S. Cl.
CPC ............ *G06T 7/002* (2013.01); *G06T 7/0048* (2013.01); *G06T 7/408* (2013.01)

(58) Field of Classification Search
CPC ........ G06T 7/002; G06T 7/0048; G06T 7/408
USPC ........................................................ 348/46
See application file for complete search history.

(56) References Cited

U.S. PATENT DOCUMENTS

| | | | |
|---|---|---|---|
| 6,917,702 B2* | 7/2005 | Beardsley | G06T 7/85 345/419 |
| 2010/0202668 A1* | 8/2010 | Du | G06K 9/0061 382/117 |
| 2015/0145959 A1* | 5/2015 | Tang | G06K 9/00711 348/46 |
| 2016/0055268 A1* | 2/2016 | Bell | G06F 17/5004 703/1 |
| 2017/0076142 A1* | 3/2017 | Chang | G06K 9/00281 |

* cited by examiner

*Primary Examiner* — Jamie J Atala
*Assistant Examiner* — Ayman A Abaza
(74) *Attorney, Agent, or Firm* — Chip Law Group

(57) ABSTRACT

Various aspects of a system and a method for extrinsic camera parameters calibration by use of a three dimensional (3D) calibration are disclosed herein. In accordance with an embodiment, the system includes an electronic device, which receives an image, which includes the 3D calibration object with a plurality of unique identifiers. One or more appearance parameters of the 3D calibration object and/or a plurality of intrinsic camera parameters of an image-capturing device that captured the received image, are further received. A positional probability is computed for each of the plurality of unique identifiers distributed in the received image. The plurality of unique identifiers of the 3D calibration object are located in the received image to calibrate the extrinsic camera parameters based on the computed positional probability, the received one or more appearance parameters of the 3D calibration object, and the plurality of intrinsic camera parameters.

19 Claims, 15 Drawing Sheets

SYSTEM AND METHOD FOR EXTRINSIC CAMERA PARAMETERS CALIBRATION BY USE OF A THREE DIMENSIONAL (3D) CALIBRATION OBJECT

CROSS-REFERENCE TO RELATED APPLICATIONS/INCORPORATION BY REFERENCE

None.

FIELD

Various embodiments of the disclosure relate to a system and method for extrinsic camera parameters calibration. More specifically, various embodiments of the disclosure relate to system and method for extrinsic camera parameters calibration by use of a three dimensional (3D) calibration object.

BACKGROUND

Geometric camera calibration is a technique that estimates various parameters of a lens and image sensors of an image-capturing device, such as a camera. Usually, such parameters may refer to intrinsic and extrinsic camera parameters and distortion coefficients. Currently, two dimensional (2D) patterns for calibration are widely used for camera calibration purposes. In certain scenarios, existing 2D patterns may be applied to four facades of a 3D calibration box. The 2D patterns usually contain numerous identical feature points, which makes detection of the feature points in a captured image error prone. Further, detection accuracy of the feature points may be variable for different viewing angles of cameras with respect to the 2D patterns, captured by the cameras. A perspective distortion may make detection of the feature points and precise camera positioning more difficult. For such 2D patterns, the position of each camera may be restricted by a viewing angle so that the 2D pattern is discernible by the cameras. Thus, an advanced and an efficient technique or system may be required for a precise estimation and/or calibration of extrinsic camera parameters of one or more cameras.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method are provided for extrinsic camera parameters calibration by use of a three dimensional (3D) calibration object substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
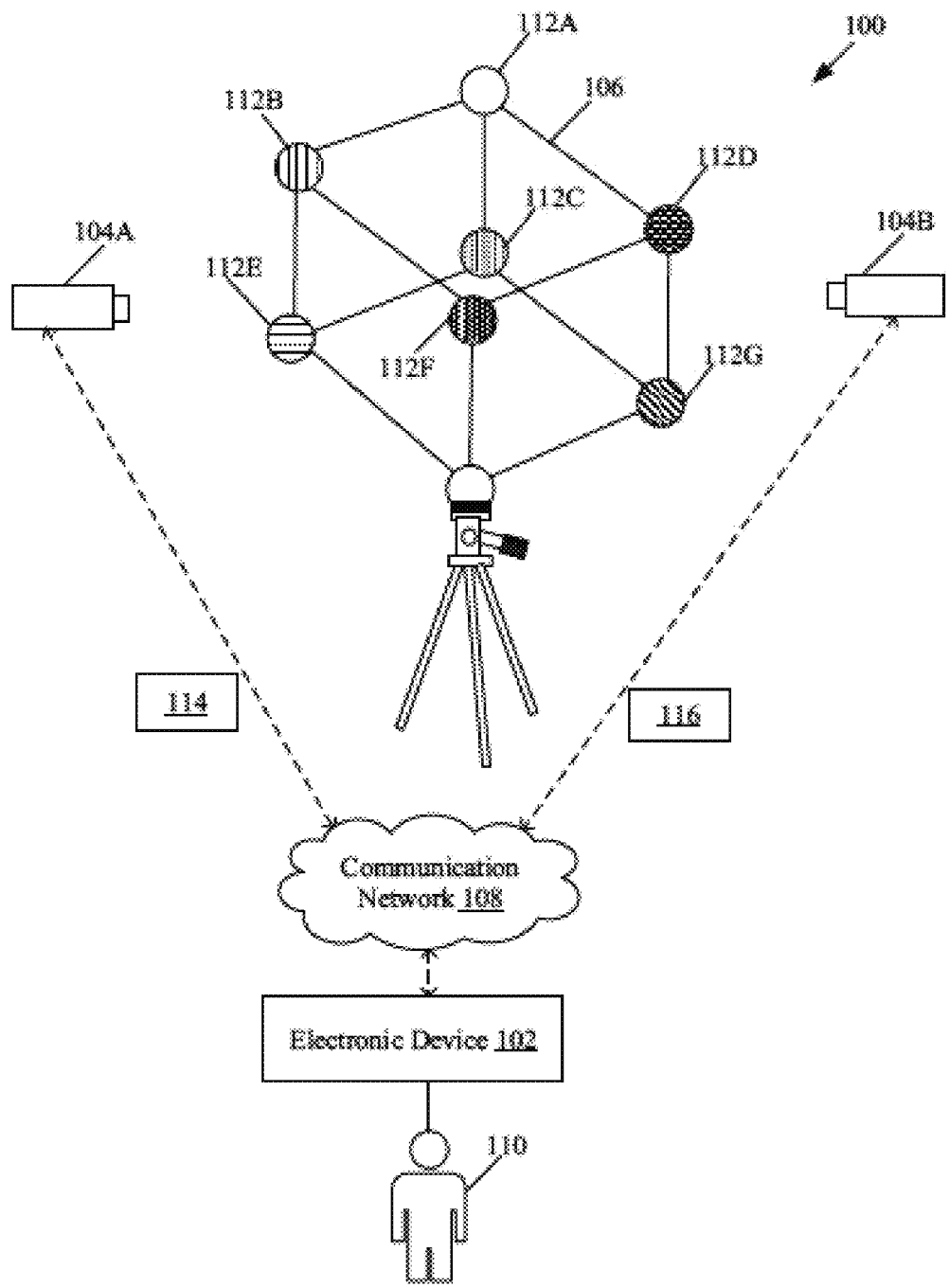
FIG. 1 is a block diagram that illustrates a network environment for extrinsic camera parameters calibration by use of a three dimensional (3D) calibration object, in accordance with an embodiment of the disclosure.

The following described implementations may be found in the disclosed system and method for extrinsic camera parameters calibration by use of a three dimensional (3D) calibration object. Exemplary aspects of the disclosure may include an electronic device, which may receive an image, which includes the 3D calibration object with a plurality of unique identifiers. One or more appearance parameters of the 3D calibration object and/or a plurality of intrinsic camera parameters of an image-capturing device that captured the received image, may be further received. A positional probability may be computed for each of the plurality of unique identifiers distributed in the received image. The plurality of unique identifiers of the 3D calibration object may be located in the received image to calibrate the extrinsic camera parameters. The plurality of unique identifiers may be located in the received image based on the computed positional probability, the received one or more appearance parameters of the 3D calibration object, and the plurality of intrinsic camera parameters.

In accordance with an embodiment, the plurality of unique identifiers of the 3D calibration object may be different colored identifiers. The one or more appearance parameters of the 3D calibration object may correspond to a color model associated with each of the plurality of unique identifiers of the 3D calibration object. The one or more appearance parameters may further correspond to a topology of the plurality of unique identifiers in the 3D calibration object, a size range of the 3D calibration object in the received image, and/or a size of each of the plurality of unique identifiers of the 3D calibration object.

In accordance with an embodiment, the plurality of unique identifiers may be searched in the received image based on the received one or more appearance parameters. A plurality of candidate identifiers in the received image may be detected based on the search of the plurality of unique identifiers. In accordance with an embodiment, the computation of the positional probability may be based on a color distribution analysis of the plurality of unique identifiers in the received image.

In accordance with an embodiment, a target window may be detected in the received image. The target window may contain highest number of different colored identifiers of the plurality of unique identifiers as compared to other windows in the received image. A window size of the target window may be set based on a pre-specified size of the 3D calibration object.

In accordance with an embodiment, the plurality of unique identifiers of the 3D calibration object may be classified into a plurality of height levels in the defected target window. A height violation check of each of the plurality of unique identifiers of the 3D calibration object may be performed in the detected target window with respect to each other. The height violation check may be performed based on the classification of the plurality of unique identifiers into the plurality of height levels and a pre-specified topology of the plurality of unique identifiers in the 3D calibration object.

In accordance with an embodiment, a region-of-interest may be detected in the received image. The region-of-interest may include the 3D calibration object with the plurality of unique identifiers based on the computed positional probability. Two dimensional (2D) pixel coordinates of the located plurality of unique identifiers of the 3D calibration object may be identified in the received image.

In accordance with an embodiment, a correspondence may be established between the identified 2D pixel coordinates of at least three of the plurality of unique identifiers in the received image with 3D real world coordinates of corresponding three or more of the plurality of unique identifiers of the 3D calibration object positioned in a 3D space. Extrinsic camera parameters for the image-capturing device may be generated for the calibration of the image-capturing device based on the established correspondence.

FIG. 1 is a block diagram that illustrates a network environment for extrinsic camera parameters calibration by use of a three dimensional (3D) calibration object, in accordance with an embodiment of the disclosure. With reference to FIG. 1, there is shown an exemplary network environment 100. The network environment 100 may include an electronic device 102, a plurality of image-capturing devices 104A and 104B, a 3D calibration object 106, a communication network 108, and one or more users, such as a user 110. The 3D calibration object 106 may include a plurality of unique identifiers 112A to 112G.

The electronic device 102 may be communicatively coupled to the plurality of image-capturing devices 104A and 104B, via the communication network 108. The electronic device 102 may receive a plurality of images of the 3D calibration object 106 captured by each of the plurality of image-capturing devices 104A and 104B, via the communication network 108. For instance, the image 114 may be received by the electronic device 102 from the image-capturing device 104A. The image 116 may be received by the electronic device 102 from the image-capturing device 104B. The user 110 may be associated with the electronic device 102.

The electronic device 102 may comprise suitable logic, circuitry, interfaces, and/or code that may be configured to receive one or more images, such as the image 114, captured by at least one of the plurality of image-capturing devices 104A and 104B. The received image, such as the image 114, may include a captured view of the 3D calibration object 106 with the plurality of unique identifiers 112A to 112G. Examples of the electronic device 102 may include, but are not limited to, a computing device, a server, a smartphone, a image- or video-processing device, a motion-capture system, one of the plurality of image-capturing devices 104A and 104B, and/or a projector.

The plurality of image-capturing devices 104A and 104B may comprise suitable logic, circuitry, interfaces, and/or code that may be configured to capture a plurality of images or video of the 3D calibration object 106. The plurality of image-capturing devices 104A and 104B may be configured to communicate with the electronic device 102. Examples of the plurality of image-capturing devices 104A and 104B may include, but are not limited to, a camera, a drone with an in-built image-capturing unit, a camcorder, and/or an image sensor.

The 3D calibration object 106 may be a 3D hollow polyhedron or a see-through 3D calibration object 106. In accordance with an embodiment, the plurality of unique identifiers 112A to 112G, may be positioned at the vertices of the 3D calibration object 106, as shown. The plurality of unique identifiers 112A to 112G may be held together and connected by use of tubes, sticks, or bars. Unlike the conventional calibration patterns, at least three or more of the plurality of unique identifiers 112A to 112G of the 3D calibration object 106 may be viewable from all angles by all of the plurality of image-capturing devices 104A and 104B.

For the sake of brevity, two cameras, such as the plurality of image-capturing devices 104A and 104B, are shown in FIG. 1. However, without departing from the scope of the disclosed embodiments, there may be more than two cameras which may capture at least three or more of the plurality of unique identifiers 112A to 112G of the 3D calibration object 106 from any given angle around the 3D calibration object 106. In accordance with an embodiment, the plurality of unique identifiers 112A to 112G may correspond to different colored balls. The size of the balls may be larger than a predetermined threshold. A large ball size may make it easier to be detected in an image even though the image of the ball is captured from a distant point. Further, the plurality of unique identifiers 112A to 112G (which correspond to features points in the captured image) may be spaced apart to enhance accuracy of detection in the captured image.

It is to be understood that the 3D calibration object 106 may have various geometrical shapes, such as a cube or a polyhedron. In accordance with an embodiment, the plurality of unique identifiers 112A to 112G may be of uniform size but with different color. In accordance with an embodiment, the plurality of unique identifiers 112A to 112G may be of different size such that each of the plurality of unique identifiers 112A to 112G may be unique. A color, size, shape, or pattern of the plurality of unique identifiers 112A to 112G, may be differentiated so that each of the plurality of unique identifiers 112A to 112G may be unique.

The communication network 108 may include a medium through which the electronic device 102 may communicate with the plurality of image-capturing devices 104A and 104B. The communication network 108 may be a wired or wireless communication network. Examples of the communication network 108 may include, but are not limited to, a Local Area Network (LAN), a Wireless Local Area Network (WLAN), a cloud network, a Long term Evolution (LTE) network, a plain old telephone service (POTS), a Metropolitan Area Network (MAN), and/or the Internet. Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols.

In accordance with an embodiment, the plurality of image-capturing devices 104A and 104B may be required to be calibrated for extrinsic camera parameters. The plurality of image-capturing devices 104A and 104B may be newly manufactured cameras that require at least extrinsic camera parameters estimation, such as a "3×3 Rotation matrix" and "3×1 Translation vector", and calibration. In another example, in a network of the plurality of image-capturing devices 104A and 104B, each of the plurality of image-capturing devices 104A and 104B may require uniform results, such as during a stereo photography, generation of a three dimensional (3D) video from different field-of-views (FOVS) of the plurality of image-capturing devices 104A and 104B.

In operation, each of the plurality of image-capturing devices 104A and 104B may capture one or more images of the 3D calibration object 106. The electronic device 102 may be configured to receive an image from at least one of the plurality of image-capturing devices 104A and 104B, such as the image-capturing devices 104A. The image, such as the image 114, may include the 3D calibration object 106 with the plurality of unique identifiers 112A to 112G. The electronic device 102 may further receive one or more appearance parameters of the 3D calibration object 106. The electronic device 102 may receive a plurality of intrinsic camera parameters, such as focal length and/or image size parameters, of the image-capturing device 104A that captured the received image. The received one or more appearance parameters, the image, the plurality of intrinsic camera parameters may be the required inputs for the electronic device 102 to process the image to estimate the extrinsic camera parameters.

In accordance with an embodiment, the one or more appearance parameters of the 3D calibration object 106 may correspond to a color model associated with each of the plurality of unique identifiers 112A to 112G of the 3D calibration object 106. The one or more appearance parameters may further include a topology of the plurality of unique identifiers 112A to 112G in the 3D calibration object 106. The plurality of unique identifiers 112A to 112G may be positioned in the 3D calibration object 106 in a certain structured arrangement. The arrangement or positioning of the plurality of unique identifiers 112A to 112G with respect to each other in the 3D calibration object 106 may correspond to the topology of the plurality of unique identifiers 112A to 112G.

In accordance with an embodiment, the one or more appearance parameters of the 3D calibration object 106 may further include a size range of the 3D calibration object 106 in the received image. For example, each of the plurality of image-capturing devices 104A and 104B, may capture one or more images of the 3D calibration object 106 in a 3D space from one or more locations (image-capturing points) in the 3D space. Accordingly, when an image of the 3D calibration object 106 is captured from a nearby point, the 3D calibration object 106 may occupy a larger area in the captured image as compared to an image captured from a distant point. Thus, a possible size range of the the 3D calibration object 106 for the 3D space may be pre-estimated.

In accordance with an embodiment, the one or more appearance parameters of the 3D calibration object 106 may further include a size of each of the plurality of unique identifiers 112A to 112G of the 3D calibration object 106. For example, the size of the balls may be known. Thus, the one or more appearance parameters of the 3D calibration object 106 may be utilized to design an identifier-specific search strategy for accurate detection of the plurality of unique identifiers 112A to 112G in the received image.

In accordance with an embodiment, the electronic device may be configured to search the plurality of unique identifiers 112A to 112G in the received image based on the received one or more appearance parameters. The electronic device may be configured to detect a plurality of candidate identifiers in the received image based on the search of the plurality of unique identifiers 112A to 112G. The objective of the search may be to accurately detect a region in the received image that includes the 3D calibration object 106. Further, to identify the plurality of unique identifiers 112A to 112G of the 3D calibration objet 106 with minimum or zero false-positives.

In accordance with an embodiment, the electronic device 102 may be configured to compute a positional probability for each of the plurality of unique identifiers 112A to 112G distributed in the received image. After the detection of the plurality of candidate identifiers in the received image, a color distribution analysis in the received image may be performed. The color distribution analysis may be performed for the plurality of candidate identifiers to compute various possible probabilities of each unique identifier of the plurality of candidate identifiers in "X" and "Y" direction in the received image. A similarity for each of the detected plurality of candidate identifiers with the received color model (with color channels) of the plurality of unique identifiers 112A to 112G may be determined. The detected candidate identifiers that are similar or highly related to the color model of the plurality of unique identifiers 112A to 112G, may be selected for further processing based on a unique identifier-specific color threshold. Thus, a probability thresholding and/or normalization may be performed to discard the candidate identifiers that are dissimilar with respect to the color model of the plurality of unique identifiers 112A to 112G. The positional probability may be an expected position of occurrence for each selected candidate identifier similar to a unique identifier of the plurality of unique identifiers 112A to 112G in the received image. The computation of positional probability is further explained in FIG. 3D.

In accordance with an embodiment, the electronic device 102 may be configured to detect a window in the received image. The window size of the target window may be set based on a pre-specified size of the 3D calibration object 106. For instance, based on the received one or more appearance parameters, the minimum and maximum possible size of the 3D calibration object 106 in the received image, may be known. Hence, the window size may be the maximum possible size of the 3D calibration object 106 in the received image. The detected target window may be the window that contains highest number of different colored identifiers of the plurality of unique identifiers 112A to 112G as compared to other windows in the received image.

In accordance with an embodiment, the electronic device 102 may be configured to shrink the target window to remove borders associated with zero identifier probability. The electronic device 102 may be configured to detect a region-of-interest in the received image that includes the 3D calibration object 106 with the plurality of unique identifiers 112A to 112G based on the computed positional probability. The uniqueness property, such as different color, of each of the plurality of unique identifiers 112A to 112G, and the topology of the plurality of unique identifiers 112A to 112G, may be utilized to detect the 3D calibration object 106 in the received image. Thereafter, a precise position of each of the plurality of unique identifiers 112A to 112G in the detected 3D calibration object 106 in the received image, may be identified or located.

In accordance with an embodiment, the electronic device 102 may be configured to classify the plurality of unique identifiers 112A to 112G of the 3D calibration object 106 into a plurality of height levels in the detected target window. For example, the unique identifier 112A may be at a first height level in the received image. The unique identifiers 112B, 112C, and 112D may be a second height level in the received image. The remaining unique identifiers 112E, 112F, and 112G may be at a third height level in the received image. In other words, the plurality of unique identifiers 112A to 112G may be separated into multiple levels according to their heights in the 3D calibration object 106.

In accordance with an embodiment, the electronic device 102 may be configured to perform a height violation check of each of the likely plurality of unique identifiers 112A to 112G of the 3D calibration object 106 in the detected target window with respect to each other. The height violation check may be based on the classification of the plurality of unique identifiers 112A to 112G into the plurality of height levels and the topology of the plurality of unique identifiers 112A to 112G in the 3D calibration object 106, as discussed above.

In accordance with an embodiment, the electronic device 102 may be configured to locate the plurality of unique identifiers 112A to 112G of the 3D calibration object 106 in the received image. The plurality of unique identifiers 112A to 112G may be located based on the computed positional probability and the received one or more appearance parameters of the 3D calibration object 106. The electronic device 102 may be configured to identify two dimensional (2D) pixel coordinates of the located plurality of unique identifiers 112A to 112G of the 3D calibration object 106 in the received image. The received plurality of intrinsic camera parameters and the identified 2D pixel coordinates of the locate plurality of unique identifiers 112A to 112G may then be utilized to estimate or generate the extrinsic camera parameters for calibration of the image-capturing device 104A that captured the received image (such as the image 114). In accordance with an embodiment, the 2D pixel coordinates may correspond to a center point (or centroid) of each of the plurality of unique identifiers 112A to 112G.

In accordance with an embodiment, the electronic device 102 may be configured to establish a correspondence between the identified 2D pixel coordinates of at least three of the plurality of unique identifiers 112A to 112G in the received image with 3D real world coordinates of corresponding three or more of the plurality of unique identifiers 112A to 112G of the 3D calibration object 106 positioned in the 3D space. Based on the established correspondence, the electronic device 102 may be configured to generate the extrinsic camera parameters for the image-capturing device 104A for the calibration. In accordance with an embodiment, one or more conventional extrinsic camera parameter estimation techniques, such as "solvePnP( )" or "solvePnPRansac( )", may then be applied based on the established correspondence.

It may be useful to precisely and efficiently calibrate a camera, such as the plurality of the image-capturing devices 104A and 104B, as calibrated camera finds applications in multiple industries, such as robotics, photography, video stitching, stereo vision, associated with computer vision. For example, 3D quantitative measures of a scene may be reconstructed or recovered from the 2D images captured by a calibrated camera. The better the accuracy of the estimation of the extrinsic camera parameters, the better is the result. A calibrated camera may be used as a quantitative sensor that may measure how far an object is from the camera, or other appearance parameters of the object, such as height or size of the object.

As the different colors of the plurality of the unique identifiers 112A to 112G, are accurately identified, the disclosed system and method may be employed for color calibration of a camera, such as the plurality of the image-capturing devices 104A and 104B. The calibrated camera by use of the disclosed system and method may be employed in color inspection applications. For instance, it may be possible to accurately discern and identify very similar colors. This may be used even in pharmaceuticals industry to identity or separate similar drug/tablet colors which may be very difficult to discern by human visual system or interpretation of color.

Further, certain conventional camera extrinsic parameter estimations with calibration objects/pattern may use fixed 2D patterns, such as chessboard pattern, symmetric or asymmetric circles. In such cases, the positions of the image-capturing devices 104A and 104B may be restricted by viewing angles in which the image-capturing devices 104A and 104B may discern the pattern. Such angles are usually less than "160 degrees" in front of the 2D calibration pattern. The disclosed system and method for extrinsic camera parameters calibration, by use of the 3D calibration object 106 (a hollow polyhedron), does not impose any limitation of viewing angles. As a result, the plurality of the image-capturing devices 104A and 104B may be positioned around the 3D calibration object 106, where at least three or more of the plurality of unique identifiers 112A to 112G of the 3D calibration object 106 may be discernible by the image-capturing devices 104A and 104B with viewing angles of full "360 degree".

In certain conventional techniques, camera extrinsic parameters may be estimated without calibration objects. Such conventional techniques use corresponding points (a point-to-point correspondence) to find a camera pair geometry. However, based on experimentation, it is observed that such camera extrinsic parameters without the calibration objects, may be applicable to the camera pairs (such as a left camera and a right camera pair) with relative yaw angle of less than 22.5 degrees. Larger yaw angles may lead to insufficient number of correspondences, or wrong correspondences in such conventional techniques. When the pair of cameras are far away from each other, it may be difficult to provide correspondences. The disclosed system and method for extrinsic camera parameters calibration by use of the 3D calibration object 106 doesn't impose such restrictions with respect to yaw angles or establishment of correspondence, as discussed above.

Figure 2:
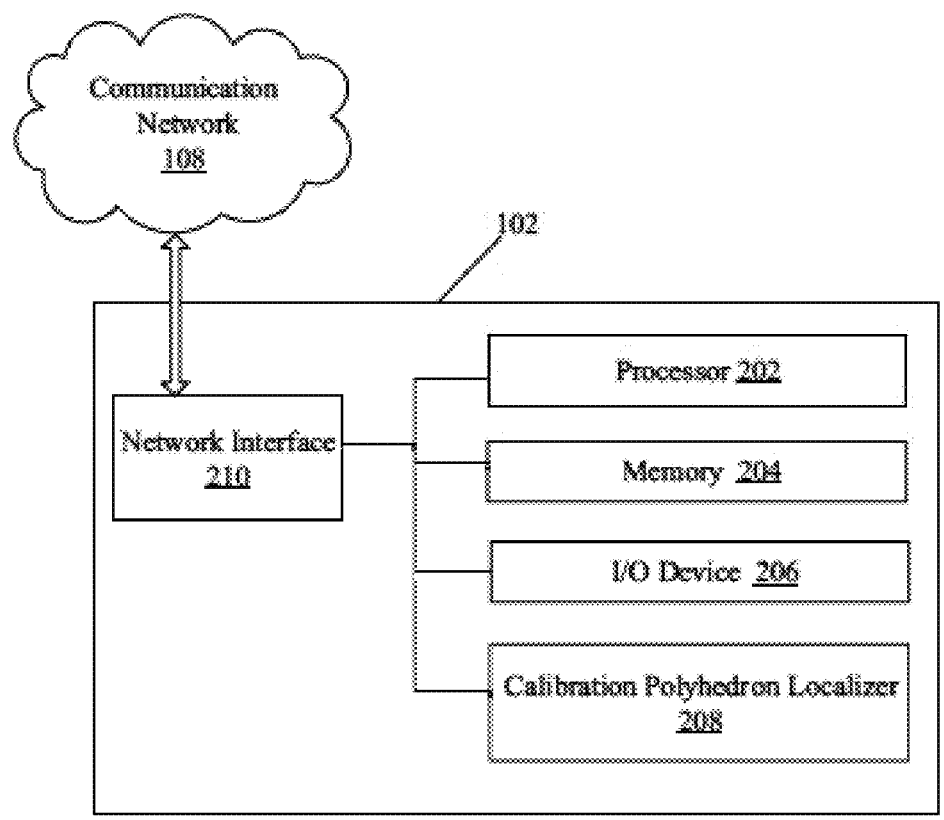
FIG. 2 illustrates a block diagram of an exemplary electronic device for extrinsic camera parameters calibration by use of a 3D calibration object, in accordance with an embodiment of the disclosure.

FIG. 2 illustrates a block diagram of an exemplary electronic device for extrinsic camera parameters calibration by use of a 3D calibration object, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, a memory 204, one or more input/output (I/O) devices, such as an I/O device 206, a calibration polyhedron localizer 208, and a network interface 210.

The processor 202 may be communicatively coupled to the memory 204, the I/O device 206, the calibration polyhedron localizer 208, and the network interface 210. The network interface 210 may communicate with the plurality of image-capturing devices 104A and 104B (FIG. 1), via the communication network 108, under the control of the processor 202.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a machine code and/or a set of instructions executable by the processor 202. The memory 204 may be further configured to store one or more appearance parameters received from one or more of the plurality of image-capturing devices 104A and 104B. The memory 204 may be further configured to store one or more configurable settings may be used to preset one or more identifier finding functions to search an identifier-specific pattern in an image. The memory 204 may also store other functions for color distribution analysis. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the user 110. The I/O device 206 may be further configured to provide an output to the user 110. The I/O device 206 may comprise various input and output devices that may be operable to communicate with the processor 202. Examples of the input devices may include, but are not limited to, an image-capturing unit (not shown), a camcorder, a touch screen, a keyboard, a mouse, a joystick, a microphone, a motion sensor, a light sensor, and/or a docking station. Examples of the output devices may include, but are not limited to, a display screen, a projector screen, and/or a speaker.

The calibration polyhedron localizer 208 may comprise suitable logic, circuitry, and/or interfaces that may be configured to compute a positional probability for each of the plurality of unique identifiers 112A to 112G distributed in an image. In accordance with an embodiment, the calibration polyhedron localizer 208 may be a part of the processor 202. Alternatively, the calibration polyhedron localizer 208 may be implemented as a separate processor or circuitry in the electronic device 102. In accordance with an embodiment, the calibration polyhedron localizer 208 and the processor 202 may be implemented as an integrated processor or a cluster of processors that perform the functions of the calibration polyhedron localizer 208 and the processor 202. In accordance with an embodiment, the calibration polyhedron localizer 208 may be implemented as a set of instructions stored in the memory 204, which on execution by the processor 202 may perform the functions of the electronic device 102.

The network interface 210 may comprise suitable logic, circuitry, interfaces, and/or code that may be configured to communicate with the plurality of image-capturing devices 104A and 104B, via the communication network 108 (as shown in FIG. 1). The network interface 210 may implement known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wired or wireless communication with the communication network 108. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Long-Term Evolution (LTE), Wireless Fidelity (Wi-Fi) (such as IEEE 802.11a, IEEE 802.11b, IEEE 802.11g and/or IEEE 802.11n), Light-Fidelity (Li-Fi), voice over Internet Protocol (VoIP), Wi-MAX, a protocol for email, instant messaging, and/or Short Message Service (SMS).

In operation, the processor 202 may be configured to receive an image from at least one of the plurality of image-capturing devices 104A and 104B, such as the image-capturing devices 104A, by use of the network interface 210. The received image may comprise the 3D calibration object 106 with the plurality of unique identifiers 112A to 112G. The processor 202 may be configured to receive the one or more appearance parameters of the 3D calibration object 106 and/or a plurality of intrinsic camera parameters of the image-capturing device, such as the image-capturing devices 104A, which captured the received image. The calibration polyhedron localizer 208 may be configured to compute a positional probability for each of the plurality of unique identifier 112A to 112G distributed in the received image. The calibration polyhedron localizer 208 may be further configured to locate the plurality of unique identifiers 112A to 112G of the 3D calibration object 106 in the received image to calibrate the extrinsic camera parameters. The plurality of unique identifiers 112A to 112G may be located based on the computed positional probability, the received one or more appearance parameters of the 3D calibration object 106, and the plurality of intrinsic camera parameters. In accordance with an embodiment, the functionalities or operations performed by the electronic device 102, as described in FIG. 1 may be performed by the processor 202 and/or the calibration polyhedron localizer 208. Other operations performed by the processor 202 and/or the calibration polyhedron localizer 208 may be understood from the description in the FIGS. 3A to 3J, and 4.

Figure 3A:
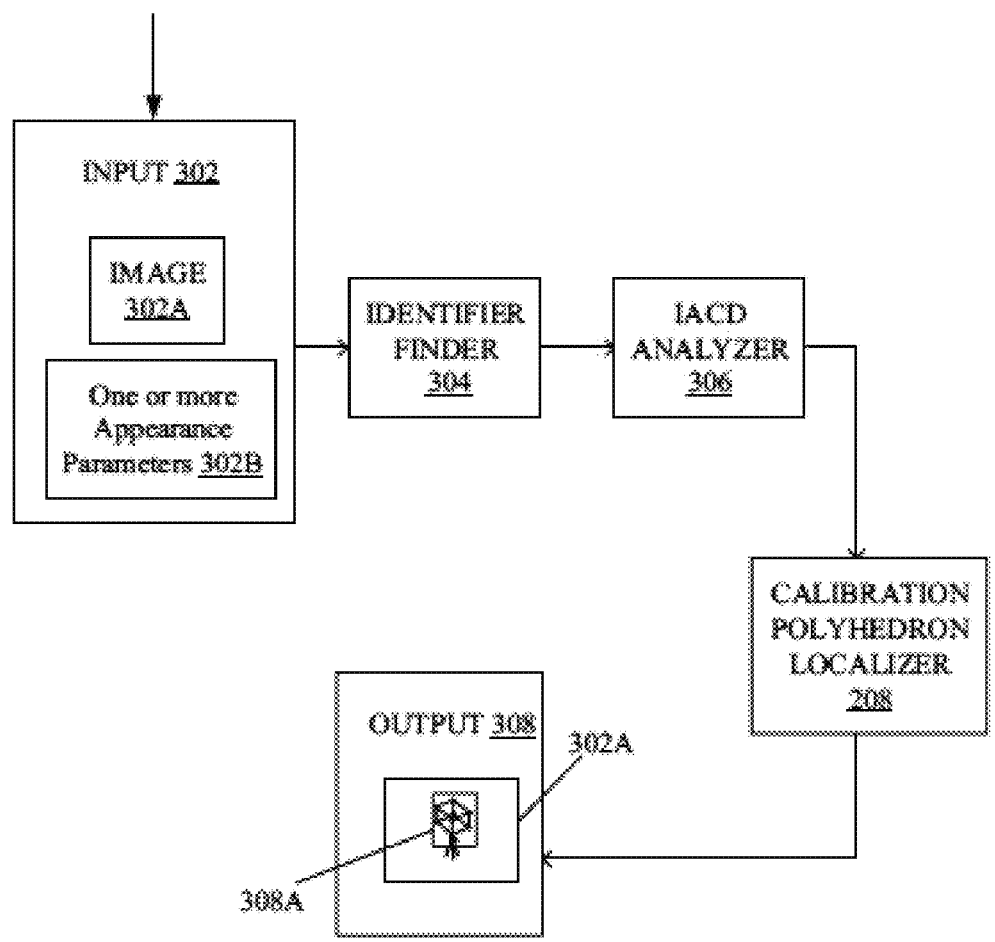
FIGS. 3A, 3B, 3C, 3D, 3E, 3F, 3G, 3H, 3I, 3J, and 3K, collectively, illustrate an exemplary scenario for implementation of the disclosed system and method for extrinsic camera parameters calibration by use of a 3D calibration object, in accordance with an embodiment of the disclosure.

FIG. 3A to 3K, collectively, illustrate an exemplary scenario for implementation of the disclosed system and method for extrinsic camera parameters calibration by use of a 3D calibration object, in accordance with an embodiment of the disclosure. FIGS. 3A to 3K are described in conjunction with elements from the FIGS. 1 and 2. With reference to FIG. 3A, there is shown an input 302 received by the electronic device 102 (FIG. 1), an identifier finder 304, an identifier area color distribution (IACD) analyzer 306, the calibration polyhedron localizer 208, and an output 308. The input 302 may include an image 302A captured by the image-capturing device 104A and one or more appearance parameters 302B of the 3D calibration object 106. The output 308 may include the image 302A with a region-of-interest 308A.

In accordance with the exemplary scenario, the image-capturing device 104A that captures the image 302A may be positioned at an appropriate height similar to the height of the 3D calibration object 106. For instance, the image-capturing device 104A may be positioned at a height that corresponds to a center of the 3D calibration object 106 from the ground. At the time of capture of the image 302A, the image-capturing device 104A may be positioned around the 3D calibration object 106 facing towards the 3D calibration object 106. The image-capturing device 104A may be positioned such that a rolling angle of less than or equal to 30 degrees, may be maintained with respect to the 3D calibration object 106.

The identifier finder 304 may be a configurable setting stored in the memory 204. The configurable setting may be used to preset one or more identifier finding functions to search an identifier-specific pattern in an image. For instance, when the unique identifier is a ball, as shown in FIG. 1, a corresponding function, such as "a circle finder function" may be selected and preset to enable search of the identifier-specific pattern in the image. Similarly, when another unique identifier, such as a hexagonal or octagonal shaped identifier, is present in the 3D calibration object 106, a different function may be selected to enable search of the other identifier (such as the hexagonal or octagonal shaped identifier).

The IACD analyzer 306 may be a function associated with color distribution analysis of the plurality of unique identifiers 112A to 112G in an image, such as the received image 302A. The processor 202 may be configured to compute a positional probability of the plurality of unique identifiers 112A to 112G in the image 302A by use of the IACD analyzer 306.

The output 308 may be a result of processing of the image 302A. The output 308 may correspond to the detected region-of-interest 308A in the received image 302A that includes the 3D calibration object 106 with the plurality of unique identifiers 112A to 112G. The calibration polyhedron localizer 208 may be configured to generate the output 308 based on the computed positional probability.

The image 302A may correspond to the image 114 (FIG. 1) captured by one of the plurality of image-capturing devices 104A and 104B, such as the image-capturing devices 104A. The one or more appearance parameters 302B may include color model of the identifiers, such as the plurality of unique identifiers 112A to 112G, identifiers topology, and size range of the 3D calibration object 106 in the image 302A.

In accordance with an embodiment, the processor 202 may be configured to receive the input 302 from the image-capturing devices 104A, via the network interface 210. The input 302 may include the image 302A captured by the image-capturing device 104A. The image 302A may include the captured 3D calibration object 106 with the plurality of unique identifiers 112A to 112G. The plurality of unique identifiers 112A to 112G. (FIG. 1) may be different colored balls. For example, the unique identifier 112A may be a white ball. The unique identifier 112B may be a red ball. The unique identifier 112C may be a magenta ball. The unique identifier 112D may be a yellow ball. The unique identifier 112E may be an orange ball. The unique identifier 112F may be a blue ball, and finally the unique identifier 112G may be a green ball. The input 302 may include the one or more appearance parameters 302B of the 3D calibration object 106.

In accordance with an embodiment, the processor 202 may be configured to search the plurality of unique identifiers 112A to 112G in the received image 302A based on the received one or more appearance parameters 302B. In accordance to the exemplary scenario, as the plurality of unique identifiers 112A to 112G corresponds to balls, so plurality of unique identifiers 112A to 112G may be searched by use of edges and blobs.

Figure 3B:
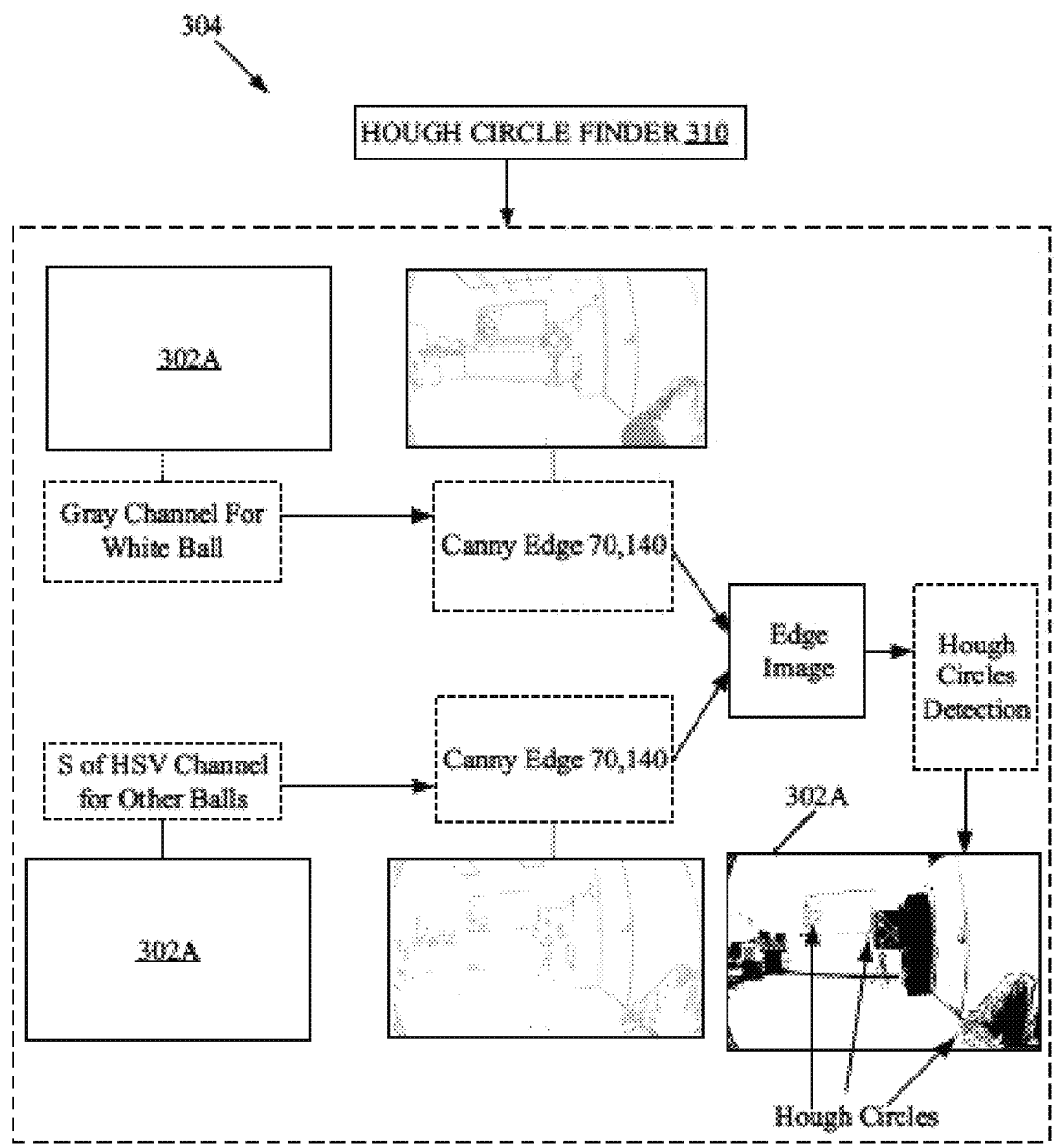

With reference to FIG. 3B, there is shown the identifier finder 304 that employs a Hough circle finder 310 to detect the plurality of unique identifiers 112A to 112G, such as the balls detected as circles in this case, in the image 302A. In accordance with an embodiment, the processor 202 may be configured to detect a plurality of candidate identifiers, such as circles, in the received image 302A, by use of the Hough circle finder 310. The Hough circle finder 310 may be a known function pre-stored as functions library in the memory 204 to detect circles in an image, such as an OpenCV function "HoughCircles( )".

The processor 202 may utilize different color channels of the received color model of the plurality of unique identifiers 112A to 112G for the circle detection. For instance, gray channel may be employed to detect while circles that correspond to the unique identifier 112A that may be the white ball. A Gaussian blur function may be applied to reduce noise and avoid false circle detection. For other colored balls, such as the unique identifiers 112B to 112G, saturation (S) of the hue-saturation-value (HSV) color model, may be used, as shown. An edge image may be obtained based on canny edge detection, on which the detected Hough circles may be automatically drawn.

Figure 3C:
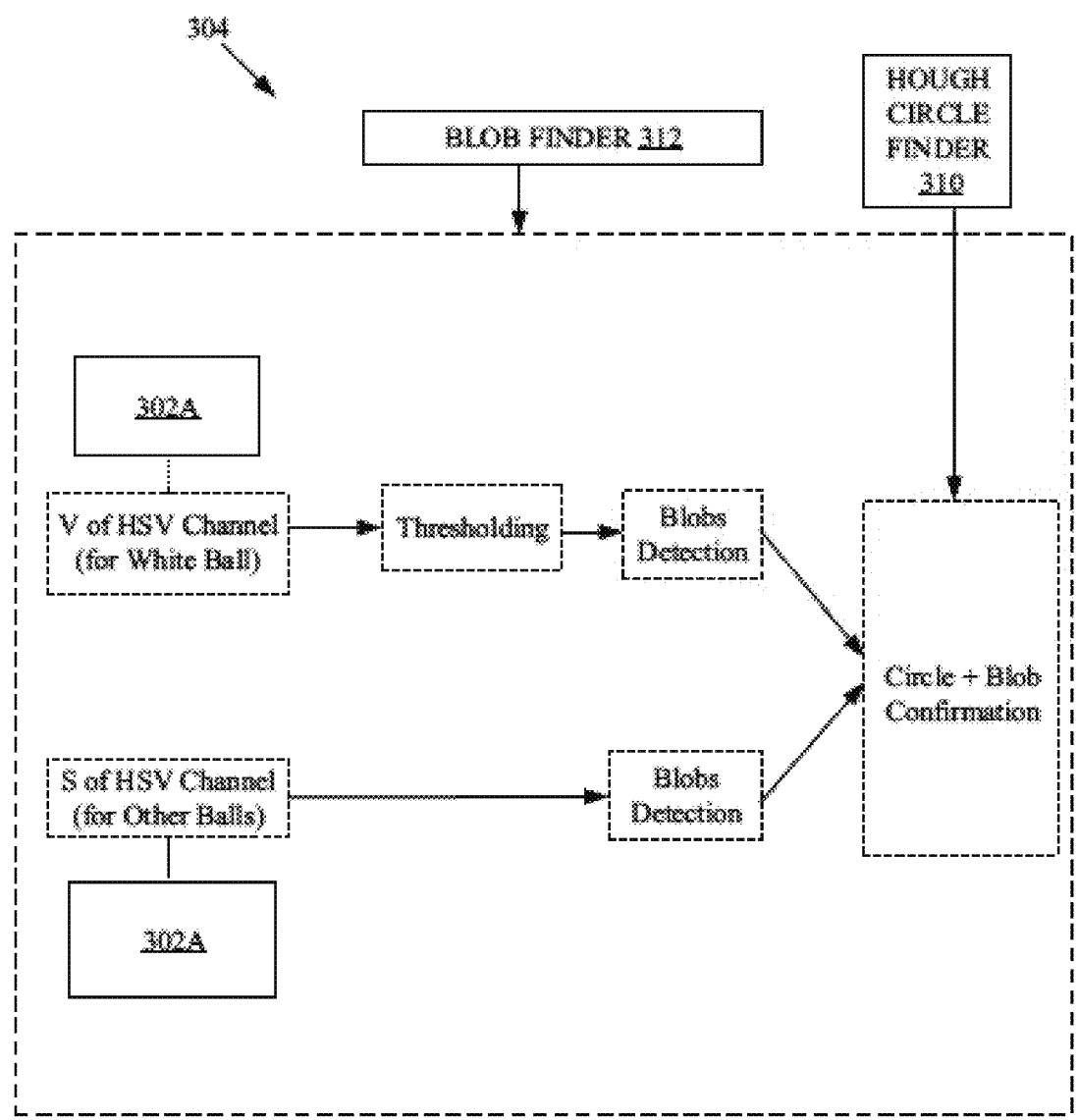

With reference to FIG. 3C, there is shown the identifier finder 304 that employs a blob finder 312 to detect the plurality of unique identifiers 112A to 112G, such as the balls detected as blobs in this case, in the image 302A. In accordance with an embodiment, the processor 202 may be configured to detect a plurality of candidate identifiers, such as blobs, in the received image 302A, by use of the blob finder 312 310. The blob finder 312 may be a known function, such as "cvblob" or "BlobDetector( )", pre-stored as functions library in the memory 204 to detect blobs in the image 302A. A blob may be a group of connected pixel in the image 302A that share some common pixel values.

The processor 202 may utilize different color channels of the received color model of the plurality of unique identifiers 112A to 112G for the blob detection too. For instance, for colored balls, such as the unique identifiers 112B to 112G, saturation (S) of the hue-saturation-value (HSV) color model, may be used, as shown. For while ball, such as the unique identifiers 112A, value (V) of the HSV color model, may be employed for blob detection in the received image 302A. A thresholding, such as "0.8*max V value", may be applied in the image 302A, to reduce noise and avoid false blob detection.

Now, to increase the accuracy of the detection of the plurality of unique identifiers 112A to 112G in the image 302A, a confirmation or validation check may be performed to obtain a valid circle in the image 302A out of the detected plurality of candidate identifiers (or candidate circles). A valid circle should have a corresponding matched blob in the image 302A. In accordance with an embodiment, the processor 202 may be configured to compute a distance between each circle center of the detected circles and a corresponding blob center. When the distance (D) is ≤ $\sqrt{2}\times$circle radius, then the detected circle is the valid circle and a match is confirmed.

Figure 3D:
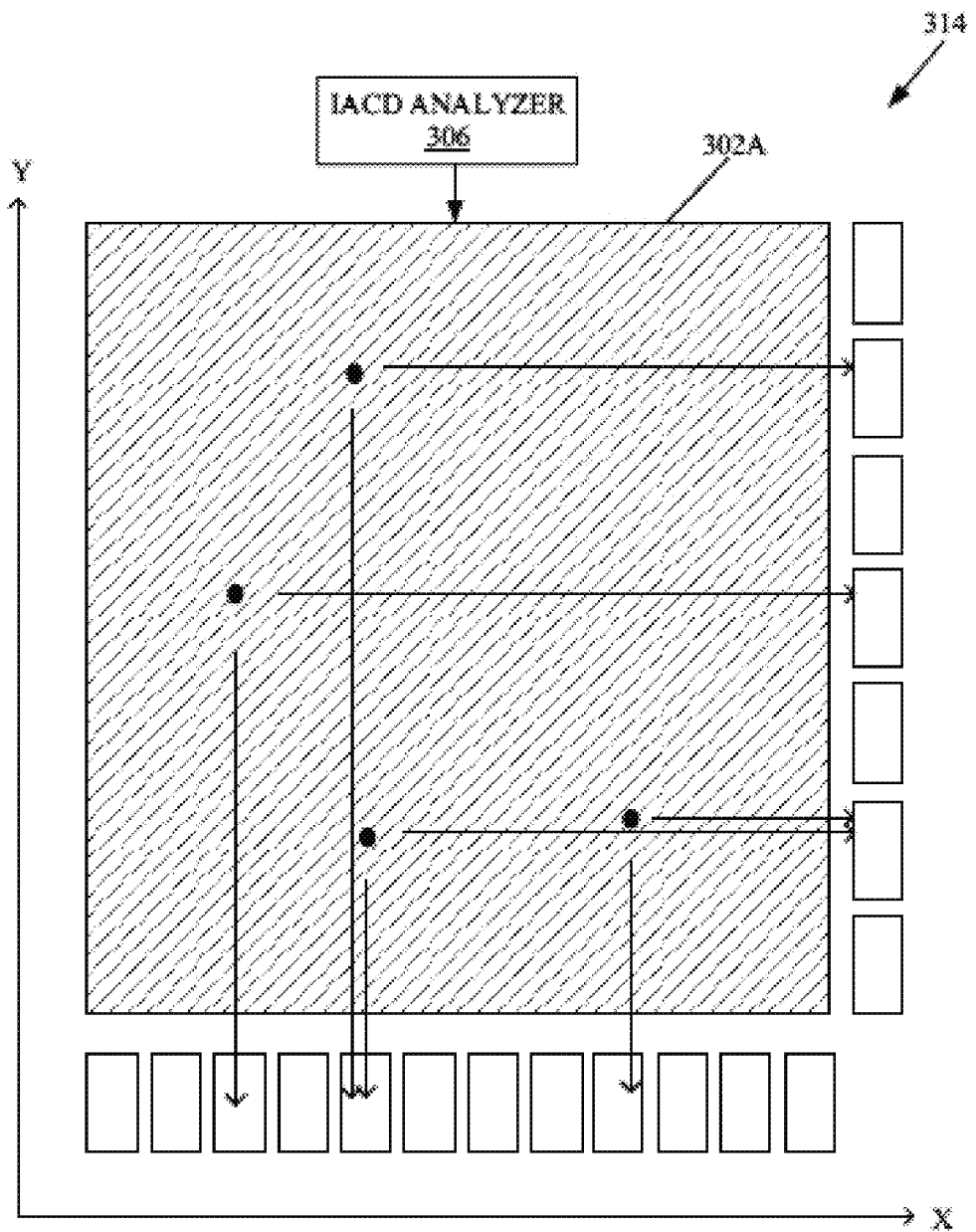

With reference to FIG. 3D, there is shown a graphical view 314 of a probability projection in "X" and "Y" direction of the image 302A. The processor 202 may be configured to perform the probability projection based on a blob area color distribution analysis in the received image 302A by use of the IACD analyzer 306. After the detection of the plurality of valid candidate identifiers (all detected valid circles) in the received image 302A, the processor 202 may be configured to compute various possible probabilities related to position, size, and color of each valid unique candidate identifier of the plurality of candidate identifiers in "X" and "Y" direction in the received image 302A.

A probability (P (i,j)) may be a probability of candidate blob "i" belonging to a unique identifier "j", and may be computed by each pixel belonging to candidate blob "i", as given below.

$$P(\text{Blob } i \text{ is ID } j | \text{ID } j\text{'s color model}) \quad (1.1)$$

$$P(i,j)=F(\{x|\text{pixel} x \in \text{Blob } i\}, \mu_j, \sigma_j), \text{ where } 0 \leq F(\cdot) \leq 1 \quad (1.2)$$

where "x" is a pixel belonging to the candidate blob "i", "i" represent a candidate blob index, "j" represent a unique identifier index, "$\mu_j$" is the mean or expectation of pre-defined feature distribution, and "$\sigma_j$" is the standard deviation of the distribution. (F) is a probability function.

In accordance with an embodiment, the pre-defined feature may be the color of a pixel where a likelihood, $p(x|\mu_j, \sigma_j)$, may be estimated by the color value of pixel "x". (F) is estimated by all $p(x|m_j, \sigma_j)$ from blob i as given below.

$$F(\cdot): F(\{p(x|m_j, \sigma_j) | \text{pixel } x \in \text{Blob } i\}) \quad (1.3)$$

A choice of function $(F) \equiv$ (1.4)

$(TT_{pixel\ x \in Blob\ i} p(x|\mu_j, \sigma_j))^{\frac{1}{Site\ of\ Blob\ i}}$ may be used.

In a next step, a similarly for each of the detected plurality of candidate identifiers (blobs) with the received color model of the plurality of unique identifiers 112A to 112G may be determined. The detected candidate identifiers that are similar or highly related with respect to the color of the plurality of unique identifiers 112A to 112G, may be selected for further processing. A probability thresholding may be performed, where the IDs j that are highly similar or related to blob "i", may be selected, as given by the expression: (candidate blobs, P>Th_cand), where each color ID has its own threshold (Th_cand) of "P" according to different "$\sigma_j$" of the expression 1.3. Thus, the candidate identifiers, such as color of blobs within the valid circles, which are dissimilar with respect to the color model of the plurality of unique identifiers 112A to 112G, may be discarded based on a pre-determined threshold. Finally, a probability may be projected for each valid unique candidate identifier in "X" and "Y" direction in the received image 302A, as an array as shown in the graphical view 314. The computed positional probability may be an expected position or likelihood-of-occurrence of each selected valid candidate identifier (valid blobs) similar to a unique identifier (based on the unique property such as color in this case) of the plurality of unique identifiers 112A to 112G in the received image 302A.

Figure 3E:
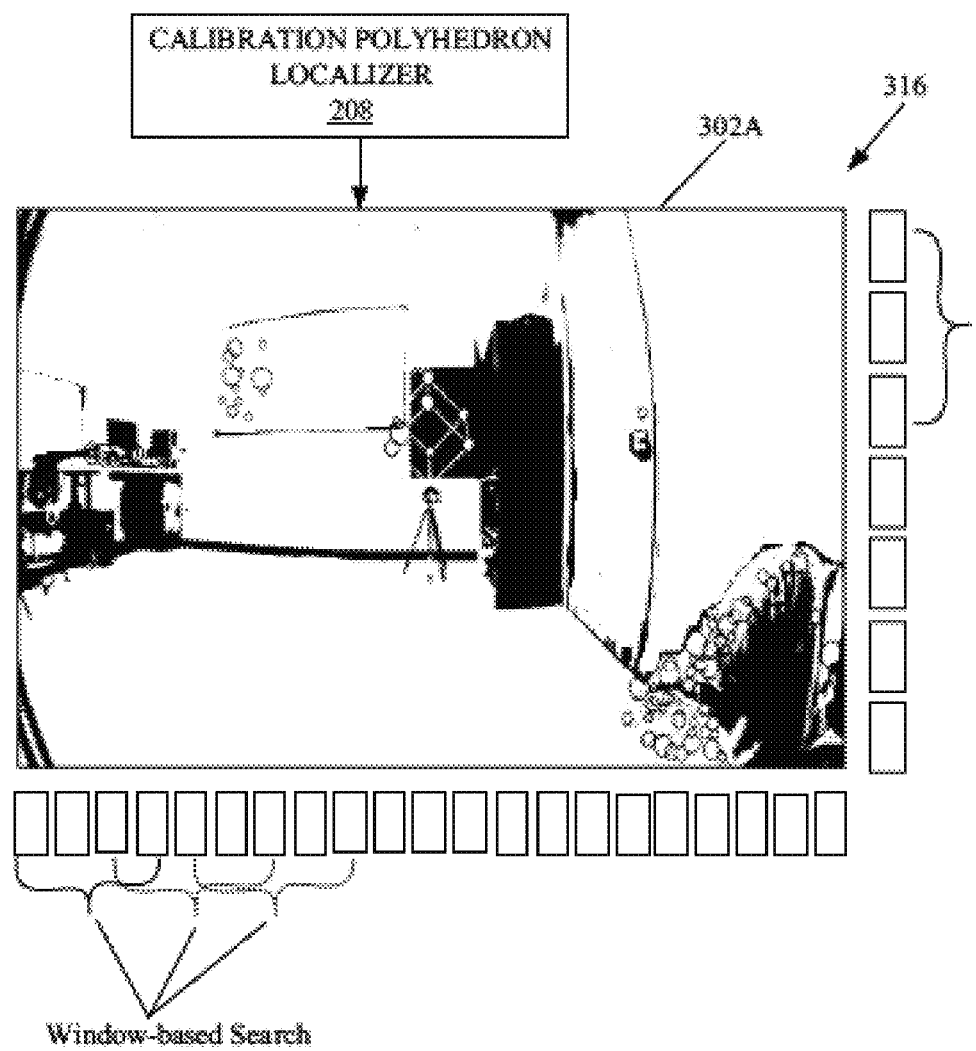

With reference to FIG. 3E, there is an intermediate view 316 of the processing of the image 302A. The intermediate view 316 depicts a window based search on the image 302A after detection and probability projection of the valid unique candidate identifiers (shown as circles) on the image 302A. The calibration polyhedron localizer 208 may be configured to perform a window based search on the image 302A. The calibration polyhedron localizer 208 may be configured to detect a target window in the received image 302A. The window size of the target window may be set based on a pre-specified size of the 3D calibration object 106. For instance, based on the received one or more appearance parameters 302B, the minimum and maximum possible size of the 3D calibration object 106 in the received image 302A, may be known. Hence, the window size may be the maximum possible size of the 3D calibration object 106 in the received image 302A. The detected target window may be the window that contains highest number of different colored identifiers (different colored balls in this case) of the plurality of unique identifiers 112A to 112G as compared to other windows in the received image 302A. The existence of a ball "j" may be defined, if the accumulated p(blob i is ID j|ID j's color model) in a window>=0.5. In accordance with an embodiment, the processor 202 may be configured to shrink the target window to remove borders associated with zero identifier (ID) probability.

Figure 3F:
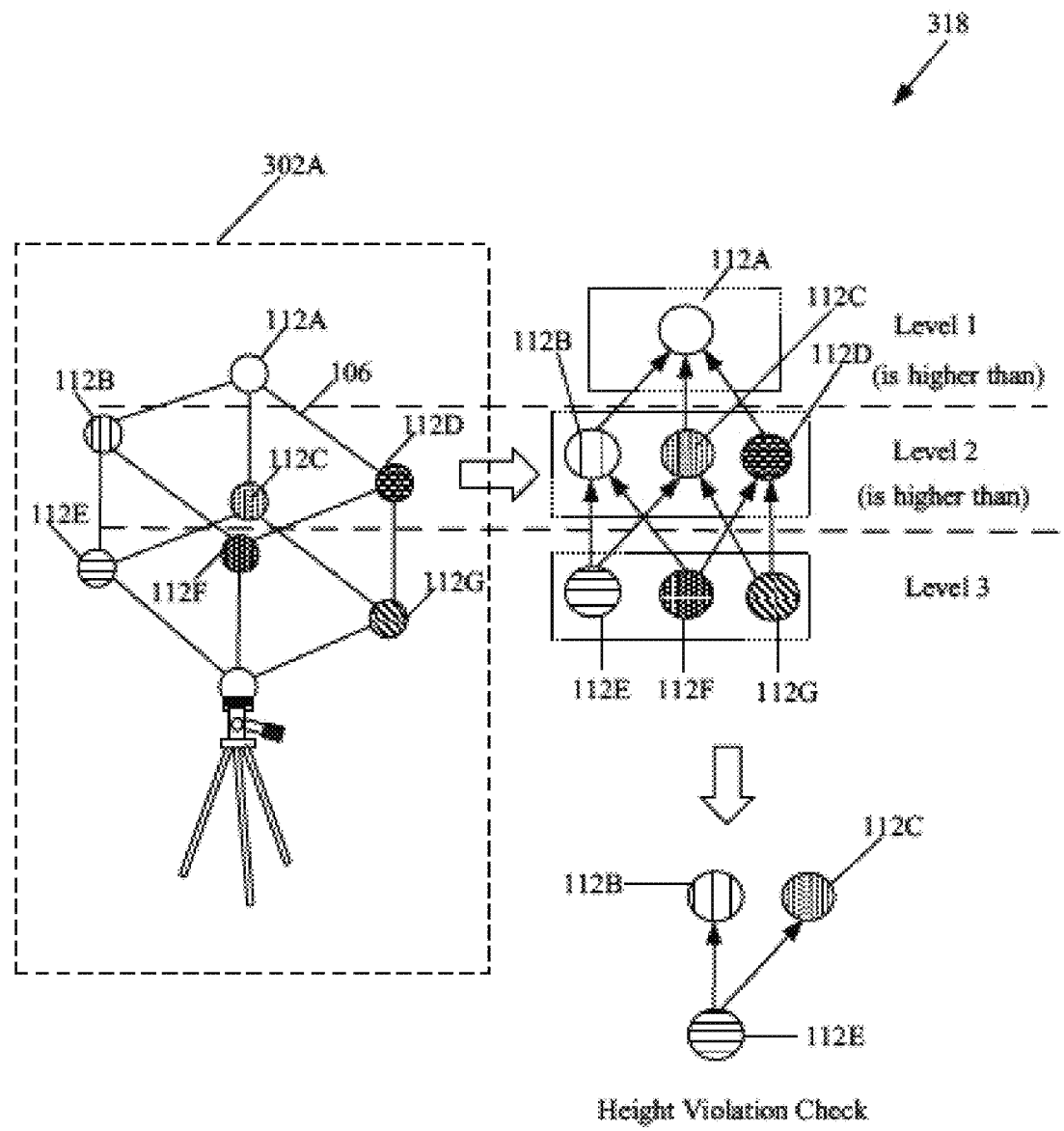

With reference to FIG. 3F, there is shown a model 318 to illustrate classification of the plurality of unique identifiers 112A to 112G of the 3D calibration object 106 into a plurality of height levels in at least one detected target window on the image 302A. The model 318 illustrates utilization of both the color and the topology of the received one or more appearance parameters 302B for identification of the 3D calibration object 106 with its plurality of unique identifiers 112A to 112G.

In accordance with an embodiment, the calibration polyhedron localizer 208 may be configured to classify and separate the plurality of unique identifiers 112A to 112G of the 3D calibration object 106 into a plurality of height levels in the detected target window. For example, the unique identifier 112A may be at a first height level in the received image. The unique identifiers 112B, 112C, and 112D may be at a second height level in the received image. The remaining unique identifiers 112E, 112F, and 112G may be at a third height level in the received image. In other words, the plurality of unique identifiers 112A to 112G may be separated into multiple levels. Level 1, Level 2, and Level 3, according to their heights in the 3D calibration object 106, as shown. Certain assumptions may be made when the plurality of unique identifiers 112A to 112G of the 3D calibration object 106 are classified into the three height levels. A first assumption may be that the detected target window includes the plurality of unique identifiers 112A to 112G. A second assumption may be that the image-capturing device 104A, may be positioned at an appropriate height, such as around the center of the 3D calibration object 106, when the image 302A is captured. A third assumption may be that the image-capturing device 104A may be positioned such that a rolling angle of less than or equal to 30 degrees, may be maintained with respect to the 3D calibration object 106 at the time of the capture of the image 302A.

In accordance with an embodiment, the calibration polyhedron localizer 208 may be configured to perform a height violation check of each of the likely plurality of unique identifiers 112A to 112G of the 3D calibration object 106 in the detected target window with respect to each other. The height violation check may be based on the classification of the plurality of unique identifiers 112A to 112G into the plurality of height levels and the topology of the plurality of unique identifiers 112A to 112G in the 3D calibration object 106. For instance, the unique identifier 112C, at level 3, may not be expected to be at near the unique identifier 112A, at level 1. Each unique identifier may be related to at least three other nearby unique identifiers of the plurality of unique identifiers 112A to 112G, as shown. Thus, the "Y" coordinates in the image 302A impose certain height constraints that may be exploited to locate the 3D calibration object 106 and accurately identify the position of the plurality of unique identifiers 112A to 112G of the 3D calibration object 106 in the image 302A.

Figure 3G:
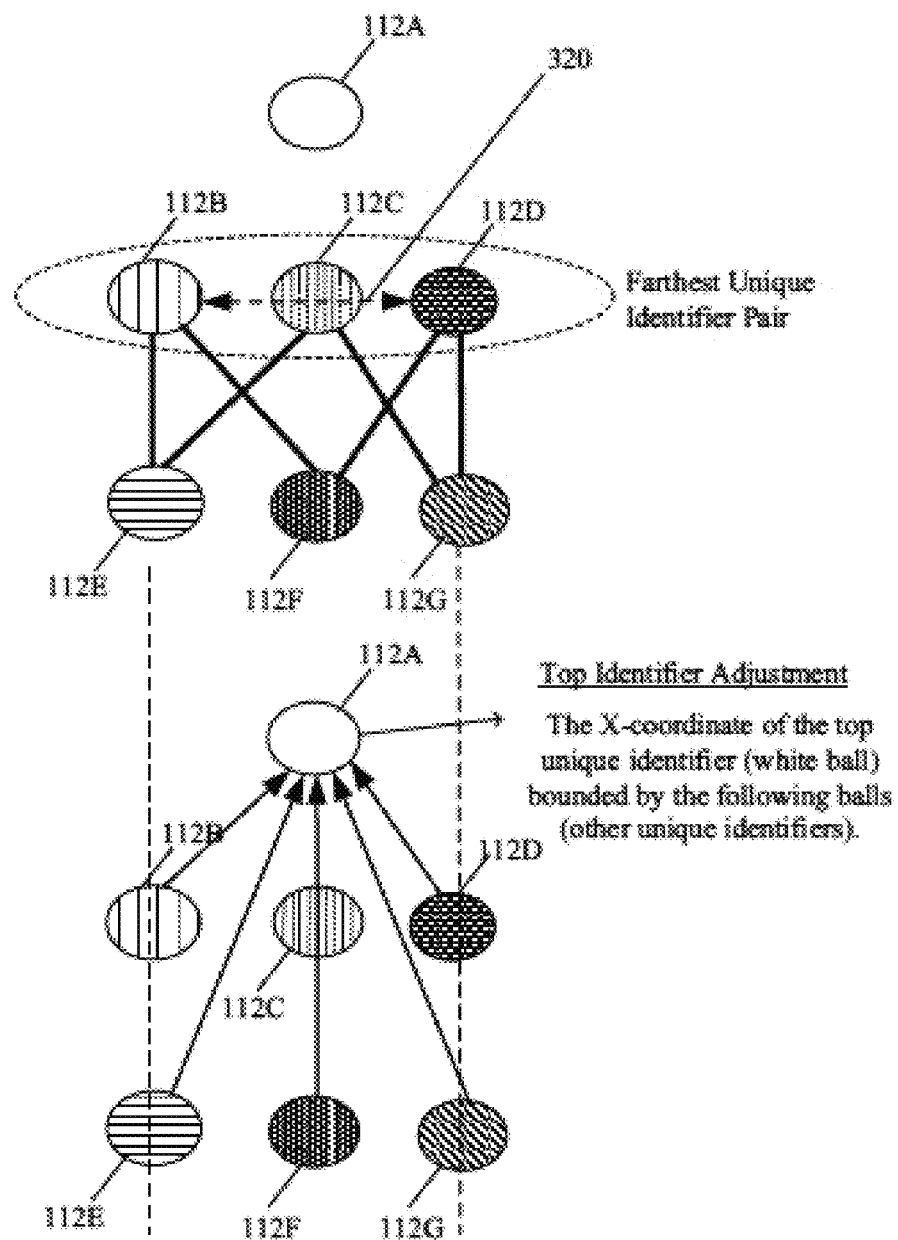

With reference to FIG. 3G, there is shown a distance 320 between two unique identifier 112B and 112D, and a relation of other unique identifiers 112B to 112G with the unique identifier 112A positioned at the topmost level (top identifier at level 1). The distance 320 and the relation of the unique identifier 112A, with the other unique identifiers 112B to 112G depicts other topological constraints that may be utilized to precisely locate the 3D calibration object 106 and accurately identify the position of the plurality of unique identifiers 112A to 112G of the 3D calibration object 106 in the image 302A. The distance 320 corresponds to farthest identifiers (such as the distance between two unique identifier 112B and 112D) pair distance in the second level and the third level. The distance 320 (shown by dashed lines) may be greater than a distance (shown by thick continuous lines) of a unique identifier with their parent level identifiers. Thus, a distance between two nearby unique identifiers may be smaller than the distance 320, which may be used to discard false-positives during a search of the plurality of unique identifiers 112A to 112G on the image 302A. The topological constraint related to the relation of the unique identifier 112A with the other unique identifiers 112B may be a condition such that an "X"-coordinate of the top identifier, that is the unique identifier 112A, should be bounded by all the balls, such as the unique identifiers 112B, 112D, 112E, 112F, and 112G (shown by arrow marks). This condition of the topological constraint may be referred to as top identifier adjustment.

Figure 3H:
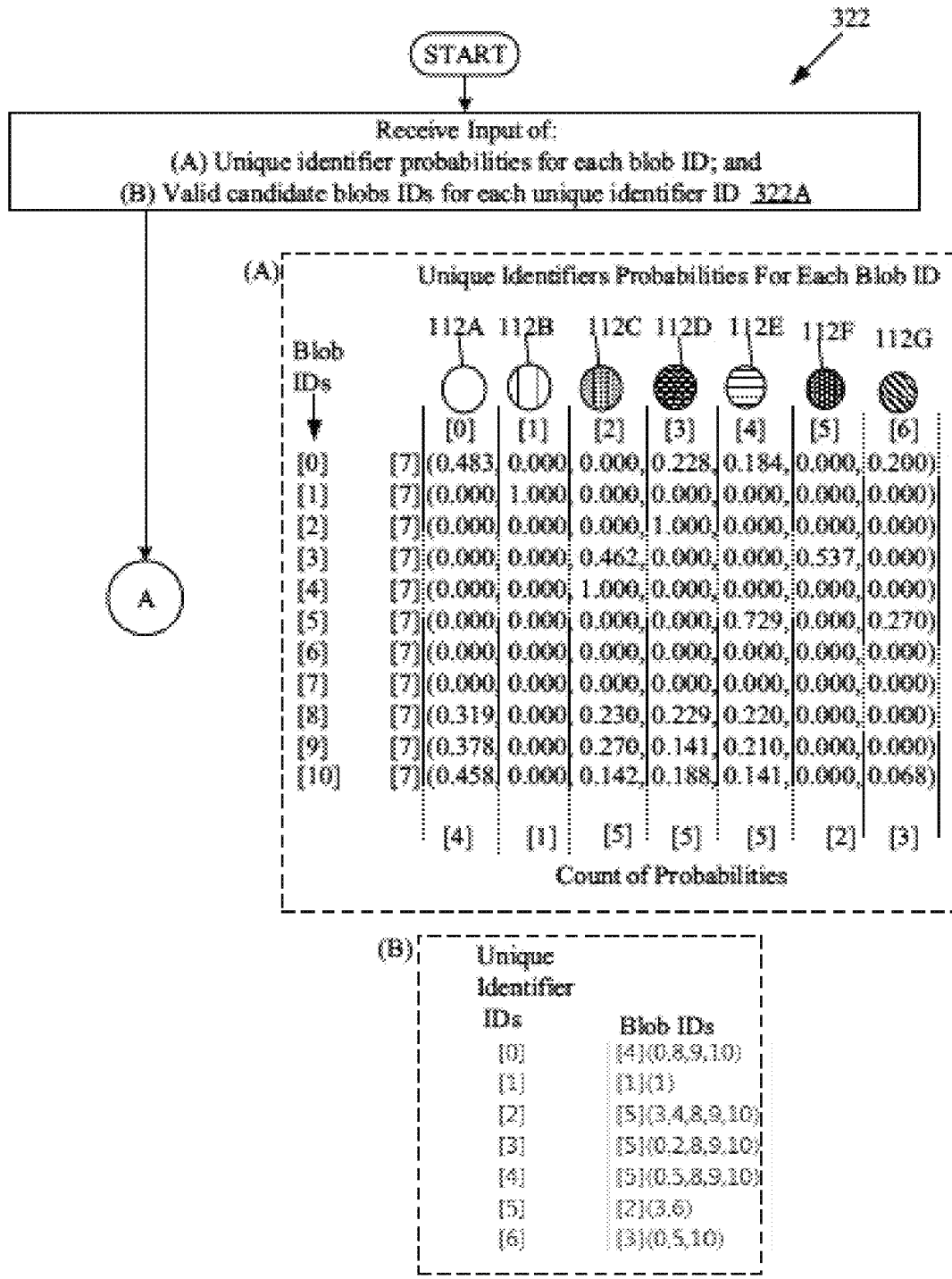
Figure 3I:
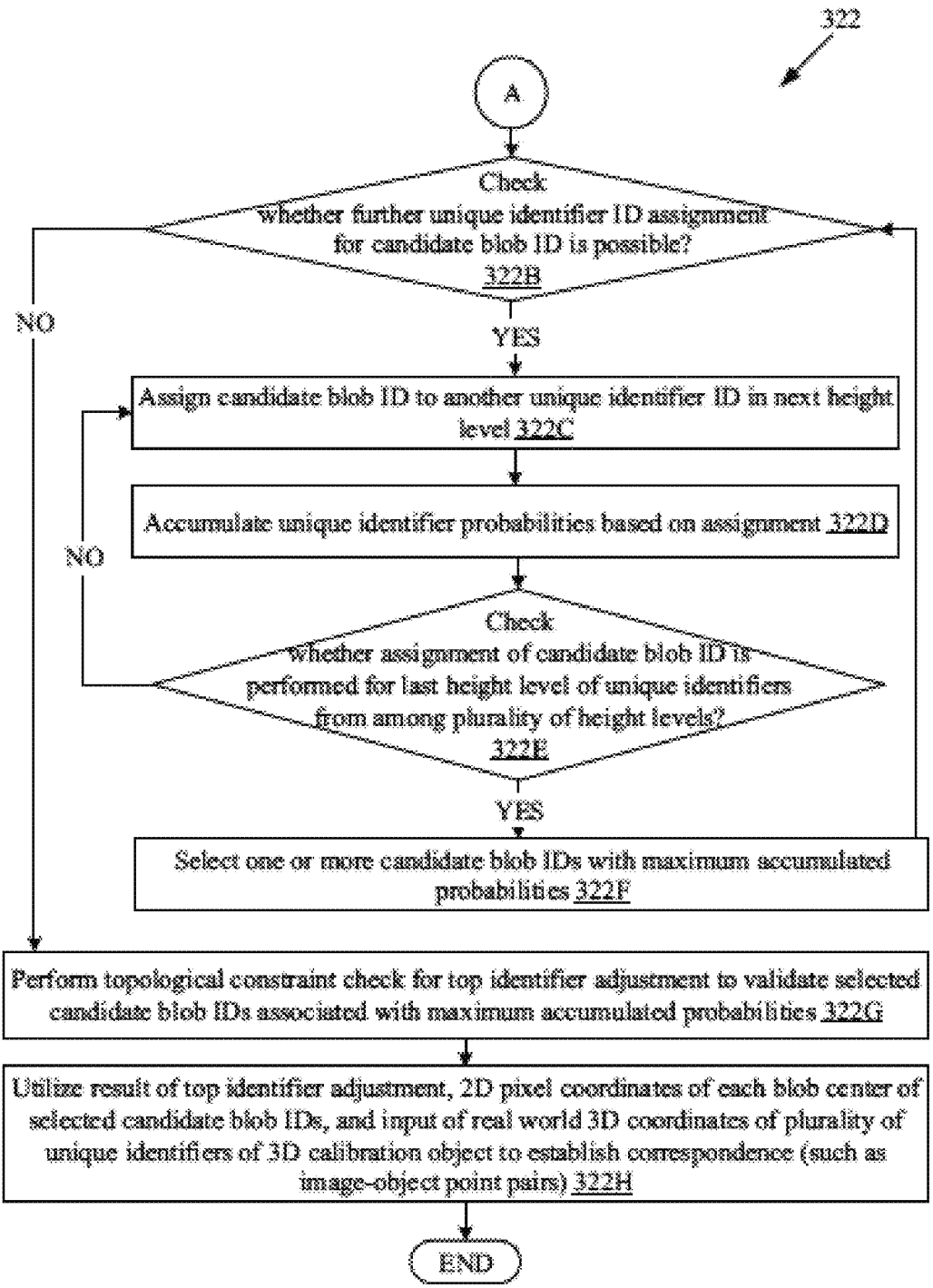

With reference to FIGS. 3H and 3I, there is shown a flowchart 322 that illustrates identification of the plurality of unique identifiers 112A to 112G of the 3D calibration object 106 in the image 302A. At step 322A, an input of valid candidate blobs IDs for each unique identifier ID, and unique identifier probabilities for each blob ID may be received by the calibration polyhedron localizer 208. At step 322B, a check may be made whether a further (any more) unique identifier ID assignment for a candidate blob ID is possible. In instances when a further assignment is possible, the control may pass to step 322C, else the control may pass to step 322G.

At step 322C, a candidate blob ID may be assigned to another unique identifier ID in a next height level. A null assignment to an identifier ID is may also be considered. The used blobs IDs may be excluded. The assignments that violate the topology (height levels and distance 320 check) of the plurality of the unique identifiers 112A to 112G of the 3D calibration object 106 may be excluded. At step 322D, the unique identifier probabilities may be accumulated (an increase in count) due to the assignment.

At step 322E, it may be checked whether the assignment of the candidate blob ID is performed for a last height level (such as the "Level 3") of unique identifiers from among the plurality of height levels. In instances when the assignment is for the last height level, the control may pass to step 322F, else the control may pass back to the step 322C. At step 322F, one or more candidate blob IDs with maximum accumulated probabilities (probability count) may be selected as current best identifiers assignment, and selection result may be saved. Further, the probability accumulator may be reset. The control may then pass back to the step 322B.

At step 322G, a topological constraint check may be performed for the top identifier adjustment. The topological constraint check may be performed for validation of a match of the topology of the selected candidate blob IDs associated with maximum accumulated probabilities (probability count) with the known topology of the plurality of unique identifiers 112A to 112G of the 3D calibration object 106. The control may pass to step 322H.

At the step 322H, the calibration polyhedron localizer 208 may utilize a result of the top identifier adjustment, 2D pixel coordinates of each blob center of the selected candidate blob IDs, and an input of the real world 3D coordinates of the plurality of the unique identifiers 112A to 112G of the 3D calibration object 106 positioned in 3D space to establish a correspondence (such as image-object point pairs). The correspondence may be established between the 2D pixel coordinates of each blob center of the selected candidate blob IDs in the received image 302A with 3D real world coordinates of corresponding plurality of unique identifiers 112A to 112G of the 3D calibration object 106 positioned in the 3D space. The control may pass to end step.

Figure 3J:
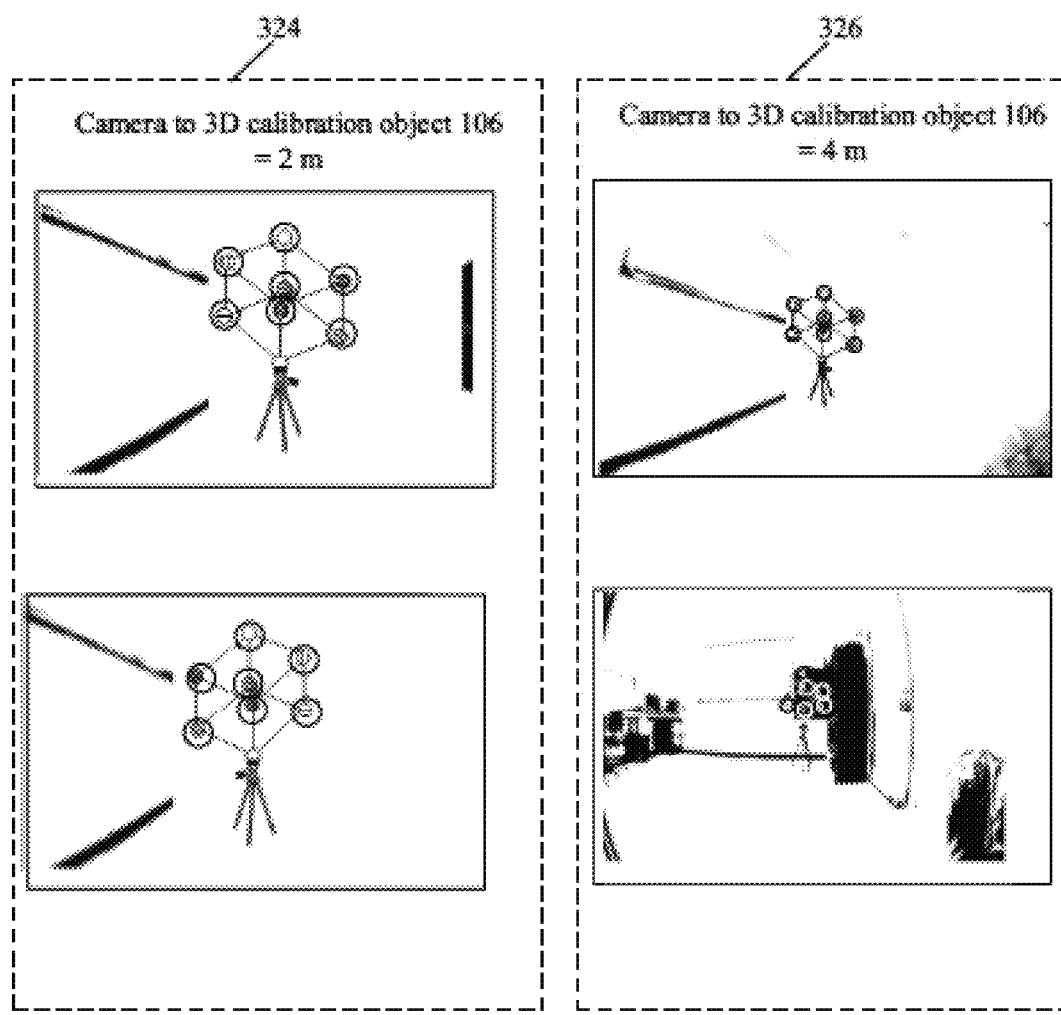

With reference to FIG. 3J, there is shown a first set of images 324 and a second set of images 326 to depict identification results of the plurality of unique identifiers 112A to 112G of the 3D calibration object 106. The first set of images 324 may be the images captured after generation of the extrinsic camera parameters to validate the calibration of the image-capturing device 104A. The first set of images 324 may be captured from various angles from a first distance, such as when the image-capturing device 104A may be two meters away from the 3D calibration object 106. The circles shown on the first set of images 324 illustrates identified plurality of unique identifier 112A to 112G irrespective of the change in position (rotation and translation in first set of images 324) of the plurality of unique identifiers 112A to 112G of the 3D calibration object 106.

The second set of images 326 may be the images captured after generation of the extrinsic camera parameters to validate the calibration of the image-capturing device 104A. The second set of images 324 may be captured from various angles from a second distance, such as when the image-capturing device 104A may be four meters away from the 3D calibration object 106. The circles shown on the second set of images 324 illustrates precisely identified plurality of unique identifiers 112A to 112G irrespective of the change in position (rotation and translation in second set of images 326) of the plurality of unique identifiers 112A to 112G of the 3D calibration object 106 and a change distance (scaling in the second set of image 326) of the 3D calibration object 106 from the image-capturing device 104A.

Figure 3K:
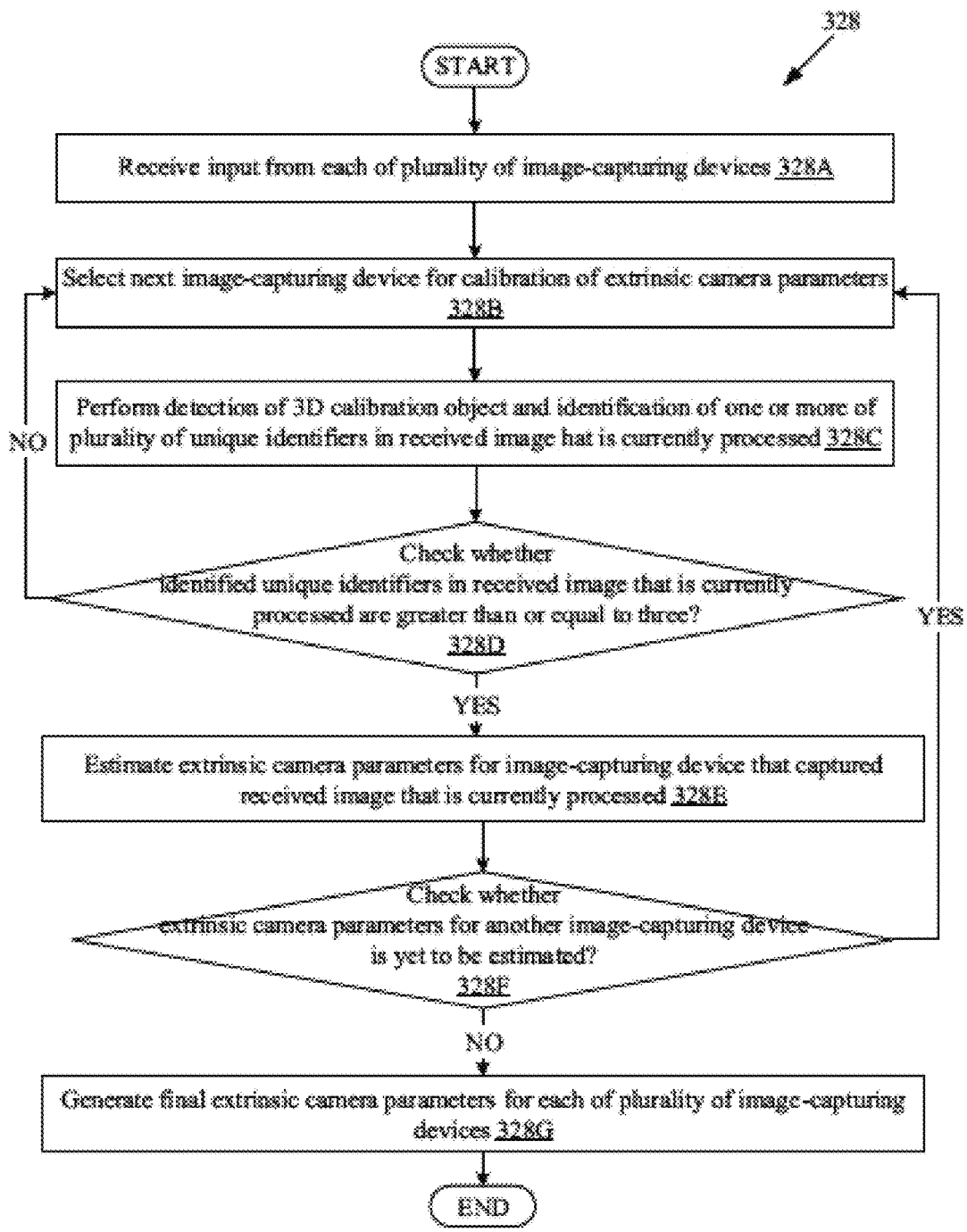

With reference to FIG. 3K, there is shown a flow chart 328 to depict extrinsic camera parameter estimation for the plurality of the image-capturing devices 104A and 104B. At step 328A, an input may be received from each of the plurality of the image-capturing devices 104A and 104B. The input may include at least an image, and a plurality of intrinsic camera parameters, such as focal length and/or image size, of each of the plurality of the image-capturing devices 104A and 104B. Each received image, captured by the plurality of the image-capturing devices 104A and 104B may include the captured 3D calibration object 106. One or more appearance parameters of the 3D calibration object 106 may also be received from at least one of the plurality of the image-capturing devices 104A and 104B or pre-stored at the electronic device 102.

At step 328B, a next image-capturing device may be selected for calibration of the extrinsic camera parameters. At step 328C, the detection of the 3D calibration object and identification of one or more of the plurality of unique identifiers 112A to 112G for received image (image currently processed), may be performed.

At step 328D, it may be checked whether the identified unique identifiers (different feature points) from the plurality of unique identifiers 112A to 112G, in a current image that is processed, are greater than or equal to three. In instances when the identified unique identifiers in the received image is greater than or equal to three, the control may pass to step 328E, else the control may pass to step 328G.

At step 328E, extrinsic camera parameters may be estimated for the image-capturing device that captured the received image that is currently processed. At step 328F, it may be checked whether extrinsic camera parameters for another image-capturing device, such as the image-capturing device 104B, is yet to be estimated. In instances when extrinsic camera parameters for another image-capturing device is yet to be estimated, the control may pass back to the step 328B. In instances when extrinsic camera parameters for all connected plurality of the image-capturing devices 104A and 104B, has been estimated, the control may pass back to the step 328G.

At step 328G, final extrinsic camera parameters may be generated for each of the plurality of the image-capturing devices 104A and 104B. The extrinsic camera parameters may be the "3×3" Rotation matrix (R), "3×1" Translation vector (t) along with intrinsic matrix (K) for each of the plurality of the image-capturing devices 104A and 104B. The generated extrinsic camera parameters may be communicated to each of the plurality of the image-capturing devices 104A and 104B for the calibration of extrinsic camera parameters. Such image-capturing devices 104A and 104B that are calibrated for the extrinsic camera parameters and color calibrations.

Figure 4A:
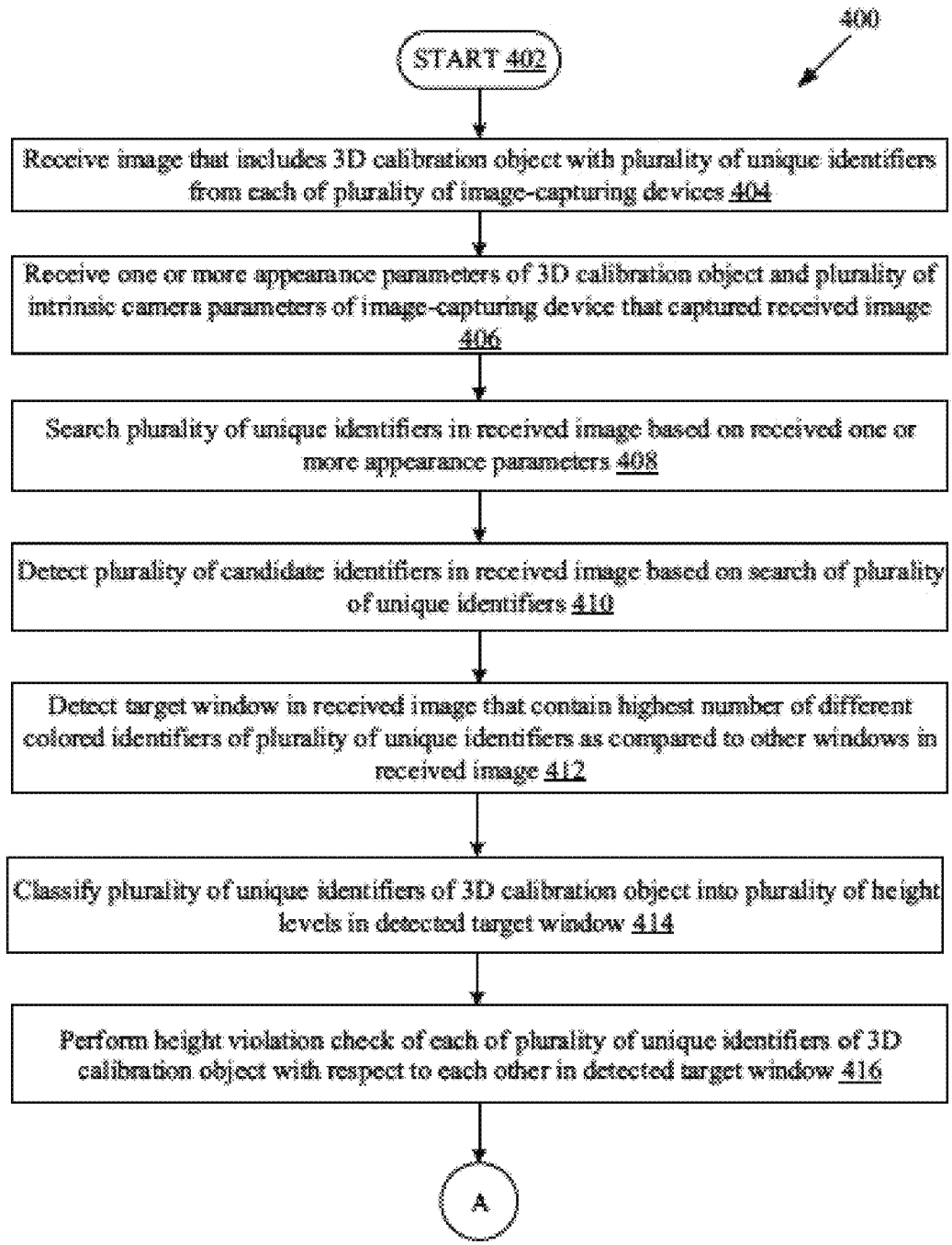
FIGS. 4A and 4B, collectively, illustrates a flow chart for implementation of an exemplary method for extrinsic camera parameters calibration by use of a 3D calibration object, in accordance with an embodiment of the disclosure.
Figure 4B:
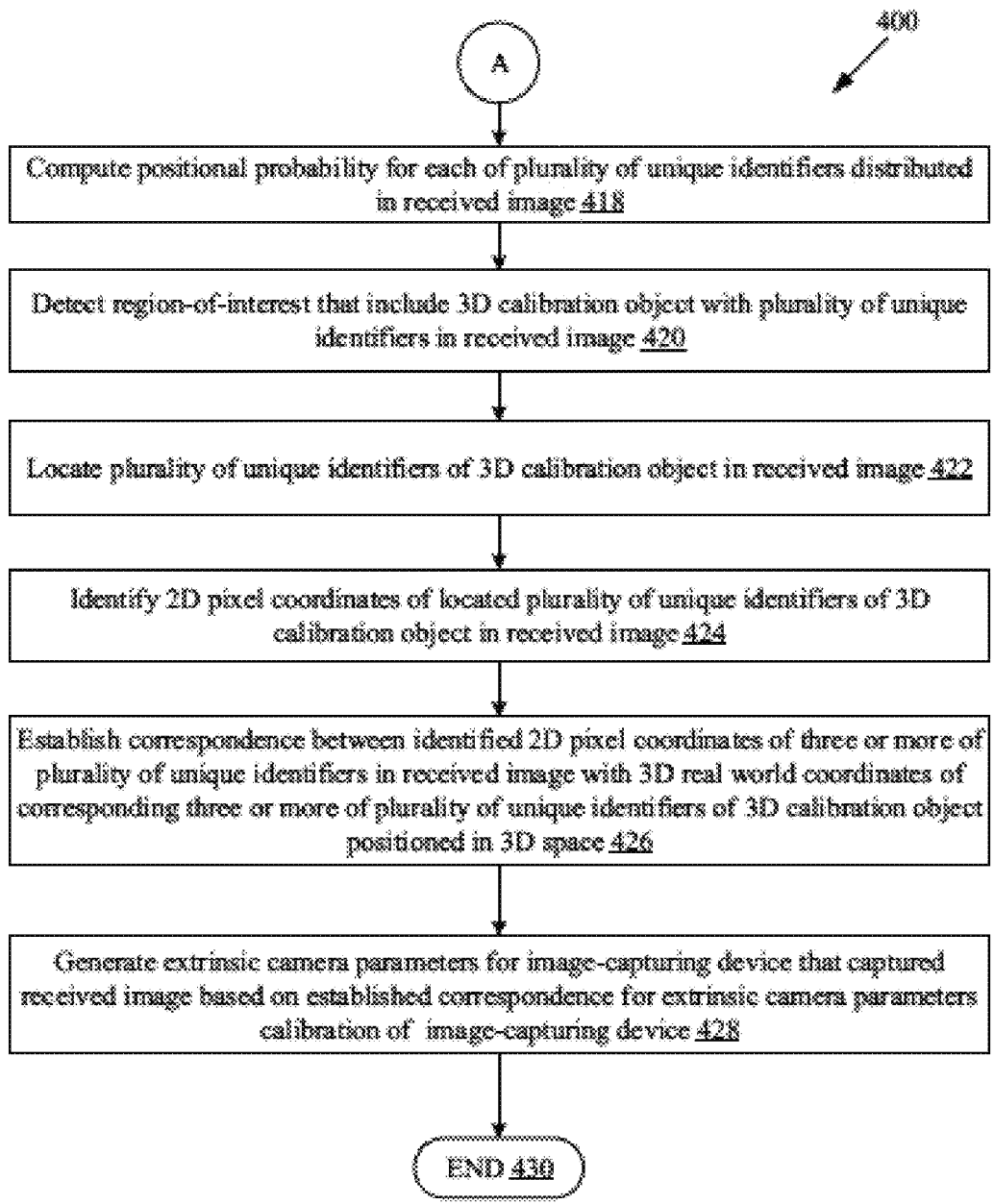

FIGS. 4A and 4B, collectively, illustrates a flow chart for implementation of an exemplary method for extrinsic camera parameters calibration by use of a 3D calibration object, in accordance with an embodiment of the disclosure. With reference to FIGS. 4A and 4B, there is shown a flow chart 400. The flow chart 400 is described in conjunction with elements from the FIGS. 1, 2, 3A to 3K. The method, in accordance with the flow chart 300, may be implemented in the electronic device 102. The method starts at step 402 and proceeds to step 404.

At step 404, an image (such as the image 114 or the image 302A) that includes the 3D calibration object 106 with the plurality of unique identifiers 112A to 112G, may be received from each of the plurality of the image-capturing devices 104A and 104B. At step 406, one or more appearance parameters (such as the one or more appearance parameters 302B) of the 3D calibration object 106 may be further received. A plurality of intrinsic camera parameters of an image-capturing device that captured the received image may also be received.

At step 408, the plurality of unique identifiers 112A to 112G may be searched in the received image based on the received one or more appearance parameters. At step 410, a plurality of candidate identifiers in the received image may be detected based on the search of the plurality of unique identifiers 112A to 112G.

At step 412, a target window may be detected in the received image based on a window-based search of the received image. A window that may contain highest number of different colored identifiers of the plurality of unique identifiers 112A to 112G as compared to other windows in the received image, may be the target window. The window size of the target window may be set based on a pre-specified size of the 3D calibration object 106. An example of window-based search is shown in FIG. 3E. At step 414, the plurality of unique identifiers 112A to 112G of the 3D calibration object 106 may be classified into a plurality of height levels in the detected target window. An example of classification into the plurality of height levels is shown in FIG. 3F.

At step 416, a height violation check of each of the plurality of unique identifiers 112A to 112G of the 3D calibration object 106 with respect to each other, may be performed in the detected target window. The height violation check may be performed based on the classification of the plurality of unique identifiers 112A to 112G into the plurality of height levels and a pre-specified topology of the plurality of unique identifiers 112A to 112G in the 3D calibration object 106. An example of height violation check is shown in FIGS. 3F and 3G. At step 418, a positional probability for each of the plurality of unique identifiers 112A to 112G distributed in the received image, may be computed. The computation of the positional probability may be based on a color distribution analysis of the plurality of unique identifiers 112A to 112G in the received image. An example of is shown in FIG. 3H.

At step 420, a region-of-interest, such as the region-of-interest 308A (FIG. 3A), may be detected in the received image. The region-of-interest may include the 3D calibration object 106 with the plurality of unique identifiers 112A to 112G based on the computed positional probability. At step 422, the plurality of unique identifiers 112A to 112G of the 3D calibration object 106 may be located in the received image to calibrate the extrinsic camera parameters. The plurality of unique identifiers 112A to 112G may be located in the received image based on the computed positional probability, the received one or more appearance parameters of the 3D calibration object 106, and the plurality of intrinsic camera parameters.

At step 424, 2D pixel coordinates of the located plurality of unique identifiers 112A to 112G of the 3D calibration object 106 in the received image, may be identified. At step 426, a correspondence may be established between the identified 2D pixel coordinates of three or more of the plurality of unique identifiers 112A to 112G in the received image with 3D real world coordinates of corresponding three or more of the plurality of unique identifiers 112A to 112G of the 3D calibration object 106 positioned in a 3D space.

At step 428, extrinsic camera parameters for the image-capturing device (such as the image-capturing device 104A) that captured received image may be generated. The generated extrinsic camera parameters may be used for the extrinsic camera parameters calibration of the image-capturing device, based on the established correspondence. The control may pass to end step 430.

In accordance with an embodiment of the disclosure, a system for extrinsic camera parameters calibration by use of the 3D calibration object 106 is disclosed. The system (such as the electronic device 102 (FIG. 1) may comprise one or more circuits (hereinafter referred to as the processor 202 (FIG. 2)). The processor 202 may be configured to receive an image that comprises the 3D calibration object 106 having at least three of more of the plurality of unique identifiers 112A to 112G. The processor 202 may be further configured to receive one or more appearance parameters of the 3D calibration object 106 and/or a plurality of intrinsic camera parameters of the image-capturing device (such as the image-capturing device 104A (FIG. 1) that captured the received image. The processor 202 may be further configured to compute a positional probability for each of the plurality of unique identifiers 112A to 112G distributed in the received image. The calibration polyhedron localizer 208 (FIG. 2) may be configured to locate the plurality of unique identifiers 112A to 112G of the 3D calibration object 106 in the received image to calibrate the extrinsic camera parameters based on the computed positional probability, the received one or more appearance parameters of the 3D calibration object 106, and the plurality of intrinsic camera parameters.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer for extrinsic camera parameters calibration by use of the 3D calibration object 106. The set of instructions in the electronic device 102 may cause the machine and/or computer to perform the steps that include receipt of an image, which includes the 3D calibration object 106 with three or more of the plurality of unique identifiers 112A to 112G. One or more appearance parameters of the 3D calibration object 106 and/or a plurality of intrinsic camera parameters of an image-capturing device that captured the received image, may be further received. A positional probability may be computed for each of the plurality of unique identifiers 112A to 112G distributed in the received image. The plurality of unique identifiers 112A to 112G of the 3D calibration object 106 may be located in the received image to calibrate the extrinsic camera parameters. The plurality of unique identifiers 112A to 112G may be located in the received image based on the computed positional probability, the received one or more appearance parameters of the 3D calibration object 106, and the plurality of intrinsic camera parameters.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system, is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A camera calibration system, comprising:
   an image-capturing device configured to capture an image of a three dimensional (3D) calibration object, wherein the 3D calibration object comprises a plurality of unique identifiers; and
   circuitry configured to:
      receive at least one appearance parameter of the 3D calibration object and a plurality of intrinsic camera parameters of the image-capturing device, wherein the at least one appearance parameter corresponds to a size of each of the plurality of unique identifiers;
      determine a plurality of candidate unique identifiers in the image based on the at least one appearance parameter;
      determine a positional probability of each of the plurality of candidate unique identifiers in the image;
      locate the plurality of candidate unique identifiers in the image based on the positional probability, the at least one appearance parameter, and the plurality of intrinsic camera parameters;
      generate a plurality of extrinsic camera parameters based on the located plurality of candidate unique identifiers; and
      calibrate the image-capturing device based on the generated plurality of extrinsic camera parameters.

2. The camera calibration system according to claim 1, wherein each of the plurality of candidate unique identifiers has a different color.

3. The camera calibration system according to claim 1, wherein the at least one appearance parameter further corresponds to at least one of a color model associated with each of the plurality of unique identifiers, a topology of the plurality of unique identifiers, or a size range of the 3D calibration object in the image.

4. The camera calibration system according to claim 1, wherein the circuitry is further configured to search the plurality of candidate unique identifiers in the image based on the at least one appearance parameter.

5. The camera calibration system according to claim 1, wherein the circuitry is further configured to determine the positional probability based on a color distribution analysis of the plurality of candidate unique identifiers in the image.

6. The camera calibration system according to claim 1,
   wherein the circuitry is further configured to detect, in the image, a target window from among a plurality of windows,
   wherein the target window has a highest number of candidate unique identifiers of the plurality of candidate unique identifiers among the plurality of windows, and
   wherein each of the candidate unique identifiers of the target window has a different color.

7. The camera calibration system according to claim 6, wherein the circuitry is further configured to set a window size of the target window based on a size of the 3D calibration object.

8. The camera calibration system according to claim 6, wherein the circuitry is further configured to classify the plurality of candidate unique identifiers into a plurality of height levels in the target window.

9. The camera calibration system according to claim 8, wherein the circuitry is further configured to determine a height violation amount of a candidate unique identifier of the candidate unique identifiers of the target window with respect to each of remaining candidate unique identifiers of the candidate unique identifiers of the target window, and wherein the determination of the height violation amount is based on the classification of the plurality of candidate unique identifiers and based on a topology of the plurality of unique identifiers in the 3D calibration object.

10. The camera calibration system according to claim 1, wherein the circuitry is further configured to detect a region-of-interest in the image based on the positional probability.

11. The camera calibration system according to claim 1, wherein the circuitry is further configured to identify two dimensional (2D) pixel coordinates of the located plurality of candidate unique identifiers in the image.

12. The camera calibration system according to claim 11, wherein the circuitry is further configured to establish a correspondence between identified 2D pixel coordinates of at least three candidate unique identifiers of the located plurality of candidate unique identifiers with 3D real world coordinates of corresponding at least three unique identifiers of the plurality of unique identifiers.

13. The camera calibration system according to claim 12, wherein the circuitry is further configured to generate the plurality of extrinsic camera parameters based on the established correspondence.

14. A camera calibration method, comprising:
capturing, by an image-capturing device, an image of a three dimensional (3D) calibration object, wherein the 3D calibration object comprises a plurality of unique identifiers;
receiving, by an electronic device, at least one appearance parameter of the 3D calibration object and a plurality of intrinsic camera parameters of the image-capturing device, wherein the at least one appearance parameter corresponds to a size of each of the plurality of unique identifiers;
determining, by the electronic device, a plurality of candidate unique identifiers in the image based on the at least one appearance parameter;
determining, by the electronic device, a positional probability of each of the plurality of candidate unique identifiers in the image;
locating, by the electronic device, the plurality of candidate unique identifiers in the image based on the positional probability, the at least one appearance parameter, and the plurality of intrinsic camera parameters;
generating, by the electronic device, a plurality of extrinsic camera parameters based on the located plurality of candidate unique identifiers; and
calibrating, by the electronic device, the image-capturing device based on the generated plurality of extrinsic camera parameters.

15. The camera calibration method according to claim 14, further comprising searching, by the electronic device, the plurality of candidate unique identifiers in the image based on the at least one appearance parameter.

16. The camera calibration method according to claim 14, further comprising detecting, in the image by the electronic device, a target window from among a plurality of windows,
wherein the target window has a highest number of candidate unique identifiers of the plurality of candidate unique identifiers among the plurality of windows, and
wherein each of the candidate unique identifiers of the target window has different color.

17. The camera calibration method according to claim 16, further comprising classifying, by the electronic device, the plurality of candidate unique identifiers into a plurality of height levels in the target window.

18. The camera calibration method according to claim 17, further comprising determining, by the electronic device, a height violation amount of a candidate unique identifier of the candidate unique identifiers of the target window with respect to each of remaining candidate unique identifiers of the candidate unique identifiers of the target window, and wherein the determination of the height violation amount is based on the classification of the plurality of candidate unique identifiers and based on a topology of the plurality of candidate unique identifiers in the 3D calibration object.

19. The camera calibration method according to claim 14, further comprising generating, by the electronic device, the plurality of extrinsic camera parameters based on two-dimensional (2D) pixel coordinates of the located plurality of candidate unique identifiers in the image and based on the plurality of intrinsic camera parameters of the image-capturing device.

* * * * *